United States Patent
Bard et al.

(10) Patent No.: US 10,009,988 B2
(45) Date of Patent: Jun. 26, 2018

(54) LOAD CONTROL ADJUSTMENT FROM A WIRELESS DEVICE

(71) Applicant: Lutron Electronics Co., Inc., Coopersburg, PA (US)

(72) Inventors: Benjamin F. Bard, Zionsville, PA (US); Erica L. Clymer, Northampton, PA (US); Jason C. Killo, Emmaus, PA (US); Jeremy B. Kleinberg, Lancaster, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 0 days. days.

(21) Appl. No.: 15/830,425

(22) Filed: Dec. 4, 2017

(65) Prior Publication Data
US 2018/0092194 A1    Mar. 29, 2018

Related U.S. Application Data

(63) Continuation of application No. 15/061,411, filed on Mar. 4, 2016, now Pat. No. 9,839,101.

(60) Provisional application No. 62/129,352, filed on Mar. 6, 2015.

(51) Int. Cl.
| | |
|---|---|
| *H05B 37/02* | (2006.01) |
| *G06F 3/0488* | (2013.01) |
| *H04L 12/28* | (2006.01) |
| *H05B 39/08* | (2006.01) |
| *G06F 3/041* | (2006.01) |

(52) U.S. Cl.
CPC ....... *H05B 37/0272* (2013.01); *G06F 3/0412* (2013.01); *H04L 12/2816* (2013.01); *H05B 39/088* (2013.01); *H04L 2012/2841* (2013.01)

(58) Field of Classification Search
None
See application file for complete search history.

(56) References Cited

U.S. PATENT DOCUMENTS

| | | |
|---|---|---|
| 8,228,163 B2 | 7/2012 | Cash et al. |
| 2013/0010018 A1 | 1/2013 | Economy |
| 2013/0026947 A1 | 1/2013 | Economy et al. |
| 2013/0030589 A1 | 1/2013 | Pessina et al. |
| 2014/0001846 A1 | 1/2014 | Mosebrook et al. |
| 2014/0265568 A1 | 9/2014 | Crafts et al. |
| 2014/0269222 A1 | 9/2014 | Patton et al. |
| 2014/0277805 A1 | 9/2014 | Browne, Jr. et al. |
| 2015/0179058 A1 | 6/2015 | Crafts et al. |
| 2015/0185752 A1 | 7/2015 | Bard et al. |
| 2015/0189724 A1 | 7/2015 | Karc et al. |

(Continued)

*Primary Examiner* — Dedei K Hammond
(74) *Attorney, Agent, or Firm* — Glen Farbanish; Amy Yanek; Philip Smith

(57) ABSTRACT

A wearable wireless device may be configured for control of a parameter of a load control device. The load control device may be responsive to a network device, for example, to provide fine tune adjustment of the parameter. The wearable wireless device may include a touch-responsive visual display for displaying feedback of the parameter of the load control device. The visual display may be configured to be actuated to receive a user input to adjust the parameter of the load control device. An actuation of the visual display of the wearable wireless device may adjust the parameter by a greater percentage than the fine tune adjustment provided by the network device.

27 Claims, 14 Drawing Sheets

(56) References Cited

U.S. PATENT DOCUMENTS

2015/0282282 A1* 10/2015 Breuer .............. H05B 37/0272
                                                    315/152
2016/0054023 A1    2/2016  Baker et al.
2016/0056629 A1    2/2016  Baker et al.
2016/0224036 A1    8/2016  Baker et al.

* cited by examiner

LOAD CONTROL ADJUSTMENT FROM A WIRELESS DEVICE

CROSS-REFERENCE TO RELATED APPLICATIONS

This application is continuation of U.S. patent application Ser. No. 15/061,411, filed Mar. 4, 2016, and entitled "Load Control Adjustment From a Wearable Wireless Device" (now U.S. Pat. No. 9,839,101, issued Dec. 5, 2017), which claims the benefit of U.S. Provisional Patent Application Ser. No. 62/129,352, filed Mar. 6, 2015, and entitled "Load Control Adjustment From a Wearable Wireless Device," the entire disclosures of which are incorporated by reference herein.

BACKGROUND

Home automation systems, which have become increasingly popular, may be used by homeowners to integrate and control multiple electrical loads and/or electronic devices in the homeowners' houses. For example, a homeowner may connect appliances, lights, window treatments, thermostats, cable or satellite boxes, security systems, telecommunication systems, and other devices to each other via a wireless network. The homeowner may control these devices using a controller or user interface provided via a smart phone, a tablet, a computer, or other computing device directly connected to the network or remotely connected via the Internet. These devices may communicate with each other and the controller to improve their efficiency, their convenience, and/or their usability.

In some instances, a user may desire to control electrical loads and/or electronic devices using a device other than a smart phone, a tablet, and a computer. For example, the user may consider a smart phone, a tablet, and a computer too bulky for controlling electrical loads and/or electronic devices. Further, the user may consider a smart phone, a tablet, a computer too inconvenient, for example, due to the user having to locate the smart phone, tablet, computer for controlling with the electrical loads and/or electronic devices.

SUMMARY

As described herein, a load control system may include a wearable wireless device. The wearable wireless device may be a smart watch (e.g., an Apple® watch, and/or a Samsung® Galaxy Gear smart watch), an activity tracking device (e.g., a FitBit® device, a Misfit® device, and/or a Sony Smartband® device), smart clothing (e.g., OMsignal® smartwear, etc.), and/or smart glasses (e.g., such as Google Glass® eyewear). The wearable wireless device may be operable to transmit digital messages to one or more network devices, load control devices, gateway devices, and/or other wearable wireless devices. The wearable wireless device may be operable to transmit digital messages to other devices directly and/or via a network.

The wearable wireless device may comprise a band (e.g., a wrist band) to enable the wearable wireless device to be worn by the user. The wearable wireless device may be paired with a network device, and the wearable wireless device may communicate with the network device using a short-range wireless communication technology (such as Bluetooth® technology). The network device may be configured to transmit digital messages in response to digital messages received from the wearable wireless device. The network device may transmit digital messages to control the wearable wireless device in response to the received digital messages.

The wearable wireless device may comprise a display (e.g., a touch-responsive visual display). The wearable wireless device may have a capacitive touch pad displaced overtop the visual display. The visual display of the wearable wireless device may be smaller than the visual display of the network device. The smaller visual display of the wearable wireless device may provide less space for enabling user control than the larger visual display of the network device.

The wearable wireless device may execute a wearable control application for allowing a user of the wearable wireless device to monitor and control a lighting control system. The wearable wireless device may be configured to display on the visual display soft buttons that may be actuated by a user. The wearable wireless device may comprise a dial, which may be rotated by a user. The dial may be used to scroll through displayed options on the visual display. The wearable wireless device may transmit digital messages (e.g., to the network device) in response to actuations of the soft buttons displayed on the visual display and/or rotations of the dial. In response to the digital messages received from the wearable wireless device, the network device may transmit digital messages to the gateway device for controlling load control devices. The network device may be configured to transmit digital messages to the wearable wireless device in response to digital messages received from the gateway device for displaying data (e.g., status information) on the display of the wearable wireless device. The wearable wireless device may receive digital messages from the gateway device directly.

The wearable wireless device may display a load control adjustment screen for controlling a load control device via a parameter. The parameter may indicate an intensity of a lighting load and/or a position of a motorized window treatment. The load control adjustment screen may control one or more zones of lighting (e.g., controlled lighting loads, such as the light bulbs) and/or one or more zones of motorized window treatments. The load control adjustment screen may display a lighting zone and/or a shading zone providing feedback. The feedback may be indicated as one or more icons, such as a meter (e.g., an intensity meter and/or a position meter). The one or more icons may comprise one or more segments. For example, the one or more icons (e.g., a meter) may include four segments. The lighting zone may comprise a zone name for describing the loads controlled by the zone.

The load control system may include a network device. The network device may be a smart phone (e.g., an iPhone® smart phone, an Android® smart phone, or a Blackberry® smart phone) a personal computer, a laptop, a wireless-capable media device (e.g., MP3 player, gaming device, or television), a tablet device (for example, an iPad® hand-held computing device), a Wi-Fi or wireless-communication-capable television, or any other suitable Internet-Protocol-enabled device. The network device may transmit digital messages to load control devices, wearable wireless device, gateway device, and/or other network devices. The network device may transmit digital messages directly or via a network.

The network device may have a display, which may comprise a touch screen. The touch screen may have a capacitive touch pad displaced overtop the display, such that the display may display soft buttons that may be actuated by a user. The network device may include a plurality of hard buttons, e.g., physical buttons, in addition to the display.

The network device may execute a product control application for allowing a user of the network device to monitor and/or control the lighting control system. In response to actuations of the displayed soft buttons or hard buttons, the network device may transmit digital messages. The digital messages may be sent to the gateway device through wireless communications. The network device may transmit digital messages to the gateway device for controlling the load control devices. The gateway device may be configured to transmit digital messages to the network device in response to digital messages received from the load control devices.

The network device may display a load control adjustment screen for controlling a load control device via a parameter that indicates an intensity of a lighting load and/or a position of a motorized window treatment. The load control adjustment screen may control one or more zones of lighting (e.g., controlled lighting loads, such as the light bulbs) and/or one or more zones of motorized window treatments. The load control adjustment screen may have a slider control (e.g., a vertically-arranged linear slider control) having an adjustment knob arranged along a slot. A user may press and hold the adjustment knob with a finger and slide the finger (e.g., up and down) to move the adjustment knob to adjust the intensity of the controlled lighting load.

The slider control of the network device may provide fine tune adjustment of the intensity of the controlled lighting load and/or the position of the motorized window treatments. For example, the fine tune adjustment provided by the network device may adjust the intensity of the controlled lighting load and/or the position of the motorized window treatments by a lesser percentage than provided by the wearable wireless device. The percentage of change in the load control adjustments made on the wearable wireless device may be a multiple of the percentage of change available on the network device. For example, the network device may control a dimming level and/or a shade level in increments of 1%, while the wearable wireless device may control the dimming level and/or the shade level in 10%, 25%, or 33% increments. The network device may be capable of providing fine tune adjustments due to the network device having a larger display than the display provided by the wearable wireless device. The fine tune adjustment may provide adjustments to the intensity of a lighting load and/or positions of the motorized treatments that are in smaller increments than provided by the wearable wireless device. For example, the fine tune adjustments provided by the network device may be in increments of 1% steps, 3% steps, 5% steps, etc., while the adjustments provided by the wearable wireless device may be in increments of 25% steps, 33% steps, 50% steps, etc.

The network device may be used for configuring the wearable wireless device. The network device may be used for configuring the load control devices that may be accessed by the wearable wireless device. For example, the network device may be used to configure the wearable wireless device so that the wearable wireless device may control predetermined load control devices. The predetermined load control devices may be identified as favorite load control devices.

DETAILED DESCRIPTION

Figure 1:
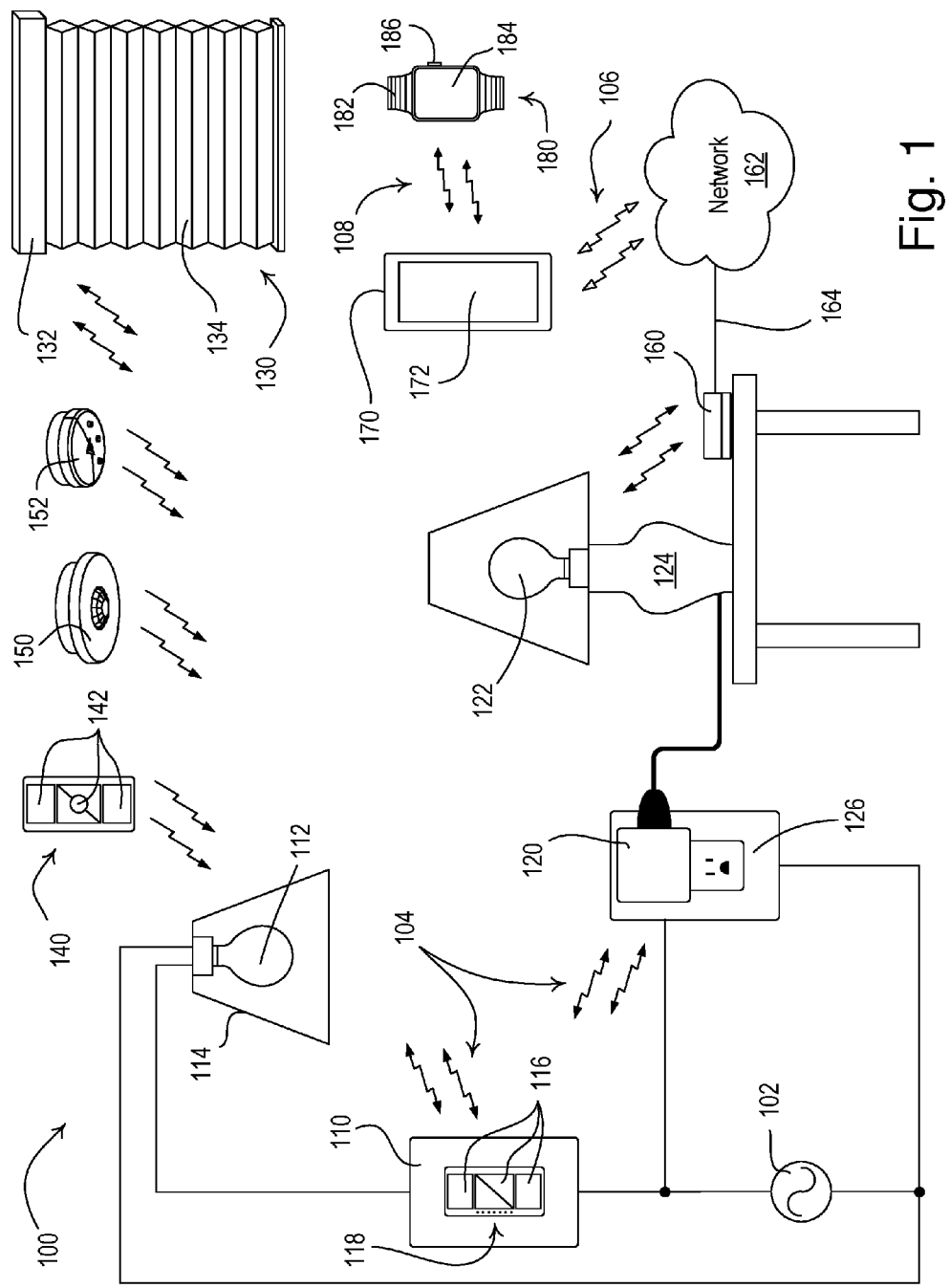
FIG. 1 is a diagram of an example load control system for controlling one or more electrical loads.

FIG. 1 is a simple diagram of an example load control system 100 (e.g., a lighting control system) for controlling the amount of power delivered from an alternating-current (AC) power source to one or more electrical loads. The load control system 100 may comprise a load control device, e.g., a wall-mounted dimmer switch 110, coupled in series electrical connection between the AC power source 102 and a lighting load, e.g., a light bulb 112 installed in a ceiling mounted downlight fixture 114. Also, or alternatively, the light bulb 112 may be installed in a wall-mounted lighting fixture or other lighting fixture mounted to another surface. The dimmer switch 110 may be adapted to be wall-mounted in a standard electrical wallbox.

The load control system 100 may also comprise other load control devices. For example, the load control system may include a plug-in load control device 120, coupled in series electrical connection between the AC power source 102 and a lighting load, e.g., a light bulb 122 installed in a lamp (e.g., a table lamp 124). The plug-in load control device 120 may be plugged into an electrical receptacle 126 that is powered by the AC power source 102 and the table lamp 124 may be plugged into the plug-in load control device. The light bulb 122 may be installed in a table lamp or other lamp that may be plugged into the plug-in load control device 120. The plug-in load control device 120 may be implemented as a table-top load control device or a remotely-mounted load control device. The load control system 100 may comprise electronic switches configured to turn on and off controlled lighting loads.

The dimmer switch 110 may comprise a plurality of actuators 116 (e.g., buttons) for controlling the light bulb 112. In response to actuation of the actuators 116, the dimmer switch 110 may be configured to turn the light bulb 112 on and off, and to increase or decrease the amount of power delivered to the light bulb 112 and thus increase or decrease the intensity of the light bulb 112 from a minimum intensity (e.g., 1%) to a maximum intensity (e.g., 100%).

The dimmer switch 110 may further comprise a plurality of visual indicators 118, e.g., light-emitting diodes (LEDs), which may be arranged in a linear array and illuminated to provide feedback of the intensity of the light bulb 112. The dimmer switch 110 may be configured to receive digital messages via wireless signals, e.g., radio-frequency (RF) signals 104, and to control the lighting load 112 in response to the received digital messages. Examples of wall-mounted dimmer switches are described in greater detail in U.S. Pat. No. 5,248,919, issued Sep. 28, 1993, entitled LIGHTING CONTROL DEVICE, and U.S. Patent Application Publication No. 2014/0132475, published May 15, 2014, entitled WIRELESS LOAD CONTROL DEVICE, the entire disclosures of which are hereby incorporated by reference.

The load control system 100 may further comprise a daylight control device. The daylight control device may be a motorized window treatment 130. The motorized window treatment 130 may be mounted in front of a window for controlling the amount of daylight entering the space in which the load control system 100 is installed. The motorized window treatment 130 may comprise, for example, a cellular shade, a roller shade, a drapery, a Roman shade, a Venetian blind, a Persian blind, a pleated blind, a tensioned roller shade system, or other suitable motorized window covering. The motorized window treatment 130 may comprise a motor drive unit 132 for adjusting the position of a covering material 134 of the motorized window treatment (e.g., a cellular shade fabric as shown in FIG. 1) in order to control the amount of daylight entering the space. The motor drive unit 132 of the motorized window treatment 130 may be battery-powered or may receive power from an external direct-current (DC) power supply. Examples of battery-powered motorized window treatments are described in greater detail in commonly-assigned U.S. Patent Application Publication No. 2012/0261078, published Oct. 18, 2012, entitled MOTORIZED WINDOW TREATMENT, and U.S. Patent Application Publication No. 2014/0305602, published Oct. 16, 2014, entitled INTEGRATED ACCESSIBLE BATTERY COMPARTMENT FOR MOTORIZED WINDOW TREATMENT, the entire disclosures of which are hereby incorporated by reference.

The load control system 100 may further comprise one or more input devices (e.g., RF transmitters) configured to transmit digital messages via the RF signals 104. For example, the input device may comprise a battery-powered remote control device 140, an occupancy sensor 150, or a daylight sensor 152. Load control devices, such as the dimmer switch 110, the plug-in load control device 120, and/or the motorized window treatment 130 may be configured to receive digital messages via the RF signals 104 transmitted by the battery-powered remote control device 140, the occupancy sensor 150, and/or the daylight sensor 152. In response to the received digital messages, the dimmer switch 110 and the plug-in load control device 120 may each be configured to turn the respective light bulb 112, 122 on and off, and/or to increase or decrease the intensity of the respective light bulb 112, 122. The motor drive unit 132 of the motorized window treatment 130 may be configured to adjust the position of the covering material 134 to control the amount of daylight entering the space in response to the digital messages received via the RF signals 104.

The remote control device 140 may comprise one or more actuators 142. The one or more actuators 142 may include one or more of an on button, an off button, a raise button, a lower button, and a preset button. The remote control device 140 may be a handheld remote control. The remote control device 140 may be mounted vertically to a wall or supported on a pedestal to be mounted on a tabletop. Examples of battery-powered remote control devices are described in greater detail in commonly-assigned U.S. Pat. No. 8,330,638, issued Dec. 11, 2012, entitled WIRELESS BATTERY-POWERED REMOTE CONTROL HAVING MULTIPLE MOUNTING MEANS, and U.S. Patent Application Publication No. 2012/0286940, published Nov. 15, 2012, entitled CONTROL DEVICE HAVING A NIGHTLIGHT, the entire disclosures of which are hereby incorporated by reference.

The remote control device 140 may transmit RF signals 104 in response to actuations of one or more of the actuators 142. For example, the RF signals 104 may be transmitted using a proprietary RF protocol, such as the ClearConnect® protocol, or a standard protocol, such as ZIGBEE, Z-WAVE, and/or KNX-RF protocols. The RF signals 104 may be transmitted using a standard wireless technology, such as one of Wi-Fi, Bluetooth, and/or Near Field Communication (NFC) technologies. The digital messages transmitted by the remote control device 140 may include a command and identifying information. For example, the identifying information may be a serial number (e.g., a unique identifier) associated with the remote control device. The remote control device 140 may be assigned to the dimmer switch 110, the plug-in load control device 120, and/or the motorized window treatment 130 during a configuration procedure of the load control system 100, such that the dimmer switch 110, the plug-in load control device 120, and/or the motorized window treatment 130 are responsive to digital messages transmitted by the remote control device 140 via the RF signals 104. Examples of methods of associating wireless control devices are described in greater detail in commonly-assigned U.S. Patent Application Publication No. 2008/0111491, published May 15, 2008, entitled RADIO-FREQUENCY LIGHTING CONTROL SYSTEM, and U.S. Patent Application Publication No. 2013/0214609, published Aug. 22, 2013, entitled TWO-PART LOAD CONTROL SYSTEM MOUNTABLE TO A SINGLE ELECTRICAL WALLBOX, the entire disclosures of which are hereby incorporated by reference.

The occupancy sensor 150 may be configured to detect occupancy and/or vacancy conditions in the space in which the load control system 100 is installed. The occupancy sensor 150 may transmit digital messages to the dimmer switch 110 and/or the plug-in load control device 120 via the RF signals 104 in response to detecting the occupancy or vacancy conditions. For example, the dimmer switch 110 and/or the plug-in load control device 120 may each be configured to turn on the respective light bulb 112, 122 in response to receiving an occupied command, and to turn off the respective light bulb in response to receiving a vacant command. The occupancy sensor 150 may operate as a vacancy sensor to turn off the lighting loads in response to detecting a vacancy condition. For example, the occupancy may not turn on the light bulbs 112, 122 in response to detecting an occupancy condition. Examples of RF load control systems having occupancy and vacancy sensors are described in greater detail in commonly-assigned U.S. Pat. No. 8,009,042, issued Aug. 30, 2011, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY-POWERED OCCUPANCY SENSOR, the entire disclosures of which are hereby incorporated by reference.

The daylight sensor 152 may be configured to measure a total light intensity perceived in the space in which the load control system is installed. The daylight sensor 152 may transmit digital messages including the measured light intensity to the load control devices, such as the dimmer switch 110, the plug-in load control device 120, and/or the motorized window treatment 130, via the RF signals 104 for controlling the electrical loads, which may include the intensities of the respective light bulbs 112, 122 and/or the position of the covering material 134, in response to the measured light intensity. Examples of RF load control systems having daylight sensors are described in greater detail in commonly-assigned U.S. Pat. No. 8,410,706, issued Apr. 2, 2013, entitled METHOD OF CALIBRATING A DAYLIGHT SENSOR; and U.S. Pat. No. 8,451,116, issued May 28, 2013, entitled WIRELESS BATTERY-POWERED DAYLIGHT SENSOR, the entire disclosures of which are hereby incorporated by reference.

The load control system 100 may further comprise a gateway device 160 (e.g., a bridge) configured to enable communication with a network 162. The network 162 may be a wireless and/or wired local area network (LAN). The gateway device 160 may be connected to a router (not shown) via a wired digital communication link 164 (e.g., an Ethernet communication link). The router may allow for communication with the network 162, e.g., for access to the Internet. The gateway device 160 may be wirelessly connected to the network 162, e.g., using Wi-Fi technology.

The gateway device 160 may be configured to transmit the RF signals 104 to the dimmer switch 110, the plug-in load control device 120, and/or the motorized window treatment 130 (e.g., using the proprietary and/or non-proprietary protocols) for controlling the respective light bulbs 112, 122 and/or the position of the covering material 130 in response to digital messages received from external devices via the network 162. The gateway device 160 may be configured to receive the RF signals 104 from the dimmer switch 110, the plug-in load control device 120, the motorized window treatment 130, the remote control device 140, the occupancy sensor 150, and/or the daylight sensor 152, and to transmit digital messages via the network 162 for providing data (e.g., status information) to external devices. The gateway device 160 may operate as a central controller for the load control system 100, or may simply relay digital messages between the control devices of the load control system and the network 162.

The load control system 100 may further comprise a network device 170. The network device 170 may be a smart phone (e.g., an iPhone® smart phone, an Android® smart phone, or a Blackberry® smart phone) a personal computer, a laptop, a wireless-capable media device (e.g., MP3 player, gaming device, or television), a tablet device (for example, an iPad® hand-held computing device), a Wi-Fi or wireless-communication-capable television, or any other suitable Internet-Protocol-enabled device. The network device 170 may be operable to transmit digital messages in one or more Internet Protocol packets to load control devices, wearable wireless device 180, gateway device 160, and/or other network devices. The network device 170 may be operable to transmit digital messages via RF signals 106 either directly or via the network 162. For example, the network device 170 may transmit the RF signals 106 to the gateway device 160 via a Wi-Fi communication link, a Wi-MAX communications link, a Bluetooth® communications link, a near field communication (NFC) link, a cellular communications link, a television white space (TVWS) communication link, or any combination thereof. The load control system 100 may comprise other types of network devices configured to communicate via the network 162, such as, a personal computer, a laptop, a wireless-capable media device (e.g., MP3 player, gaming device, or television), a tablet device (for example, an iPad® hand-held computing device), a Wi-Fi or wireless-communication-capable television, or any other suitable Internet-Protocol-enabled device. Examples of load control systems operable to communicate with network devices on a network are described in greater detail in commonly-assigned U.S. Patent Application Publication No. 2013/0030589, published Jan. 31, 2013, entitled LOAD CONTROL DEVICE HAVING INTERNET CONNECTIVITY, the entire disclosure of which is hereby incorporated by reference.

The network device 170 may have a visual display 172, which may comprise a touch screen. The touch screen may have a capacitive touch pad displaced overtop the visual display 172, such that the visual display may display soft buttons that may be actuated by a user. The network device 170 may comprise a plurality of hard buttons, e.g., physical buttons (not shown), in addition to the visual display 172.

The network device 170 may execute a product control application for allowing a user of the network device 170 to monitor and/or control the lighting control system 100. In response to actuations of the displayed soft buttons or hard buttons, the network device 170 may transmit digital messages. The digital messages may be sent to the gateway device 160 through the wireless communications described herein. The network device 170 may transmit digital messages to the gateway device 160 via the RF signals 106 for controlling the load control devices, such as the dimmer switch 110, the plug-in load control device 120, and/or the motorized window treatment 130. The gateway device 160 may be configured to transmit RF signals 106 to the network device 170 in response to digital messages received from the dimmer switch 110, the plug-in load control device 120, the motorized window treatment 130, the remote control device 140, the occupancy sensor 150, and/or the daylight sensor 152 (e.g., using the proprietary protocol) for displaying data (e.g., status information) on the visual display 172 of the network device 170.

The operation of the load control system 100 may be programmed and configured using the network device 170. An example of a configuration procedure for a wireless load control system is described in greater detail in commonly-assigned U.S. Patent Application Publication No. 2014/0265568, published Sep. 18, 2014, entitled COMMISSIONING LOAD CONTROL SYSTEMS, the entire disclosure of which is hereby incorporated by reference.

The load control system 100 may comprise a wearable wireless device 180, such as a smart watch (e.g., an Apple® watch, and/or a Samsung® Galaxy Gear smart watch) for controlling electrical loads and/or electronic devices. The load control system 100 may comprise another type of wearable wireless device 180, such as an activity tracking device (e.g., such as a FitBit® device, a Misfit® device, and/or a Sony Smartband® device), smart clothing (e.g., OMsignal® smartwear, etc.), and/or smart glasses (e.g., such as Google Glass® eyewear). The wearable wireless device 180 may be operable to transmit digital messages in one or more Internet Protocol packets to network device 170, load control devices, gateway device 160, and/or other wearable wireless devices. The wearable wireless device 180 may be operable to transmit digital messages to network device 170, load control devices, gateway device 160, and/or other wearable wireless devices (e.g., via RF signals 106) directly and/or via the network 162. For example, the wearable wireless device 180 may communicate directly with network device for controlling load control devices and/or electrical loads. The wearable wireless device 180 may transmit RF signals 106 to the network device 170, load control devices, gateway device 160, and/or other wearable wireless devices via a Wi-Fi communication link, a Wi-MAX communications link, a Bluetooth® communications link, a near field communication (NFC) link, a cellular communications link, a television white space (TVWS) communication link, or any combination thereof.

The wearable wireless device 180 may comprise a wrist band 182 to enable the wearable wireless device 180 to be worn on the wrist of the user. The wearable wireless device 180 may be paired with the network device 170. The wearable wireless device 180 may communicate with the network device 170 using a short-range wireless communication technology (such as Bluetooth® technology), e.g., via RF signals 108. The network device 170 may be configured to transmit digital messages via the RF signals 106 (e.g., directly to the gateway device 160 and/or to other devices on the network 162) in response to digital messages received from the wearable wireless device 180. The network device 170 may transmit digital messages to control the wearable wireless device 180 in response to digital messages received via the RF signals 106 (e.g., directly from the gateway device 160 and/or from other devices on the network 162).

The wearable wireless device 180 may comprise a touch-responsive visual display 184. The wearable wireless device 180 may have a capacitive touch pad displaced overtop the visual display 184. The visual display 184 of the wearable wireless device 180 may be substantially smaller than the visual display 172 of the network device 170. The smaller visual display 184 of the wearable wireless device 180 may provide less space for enabling user control than the larger visual display 172 of the network device 170.

The wearable wireless device 180 may execute a wearable control application for allowing a user of the wearable wireless device 180 to monitor and control the lighting control system 100. The wearable wireless device 180 may be configured to display on the visual display 184 soft buttons that may be actuated by a user. The wearable wireless device 180 may also comprise a dial 186, which may be rotated by a user. The dial may be used to scroll through displayed options on the visual display 184. The wearable wireless device 180 may transmit digital messages (e.g., to the network device 170, via the network 162, or directly to load control devices) in response to actuations of the soft buttons displayed on the visual display 184 and/or rotations of the dial 186. In response to the digital messages received from the wearable wireless device 180, the network device 170 may transmit digital messages to the gateway device 160 via the RF signals 106 for controlling the dimmer switch 110, the plug-in load control device 120, and/or the motorized window treatment 130. The network device 170 may be configured to transmit RF signals 108 to the wearable wireless device 180 in response to digital messages received from the gateway device 160 for displaying data (e.g., status information) on the visual display 184 of the wearable wireless device 180. The wearable wireless device 180 may also, or alternatively, receive digital messages from the gateway device 160 directly.

The load control system 100 may comprise one or more other types of load control devices, such as a dimming ballast for driving a gas-discharge lamp; a light-emitting diode (LED) driver for driving an LED light source; a dimming circuit for controlling the intensity of a lighting load; a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a controllable electrical receptacle or controllable power strip for controlling one or more plug-in loads; a motor control unit for controlling a motor load, such as a ceiling fan or an exhaust fan; a drive unit for controlling a motorized window treatment or a projection screen; motorized interior or exterior shutters; a thermostat for a heating and/or cooling system; a temperature control device for controlling a set-point temperature of an HVAC system; an air conditioner; a compressor; an electric baseboard heater controller; a controllable damper; a variable air volume controller; a fresh air intake controller; a ventilation controller; hydraulic valves for use radiators and radiant heating system; a humidity control unit; a humidifier; a dehumidifier; a water heater; a boiler controller; a pool pump; a refrigerator; a freezer; a television or computer monitor; a video camera; an audio system or amplifier; an elevator; a power supply; a generator; an electric charger, such as an electric vehicle charger; and/or an alternative energy controller.

In addition, the load control system 100 may comprise other types of input device, such as temperature sensors; humidity sensors; radiometers; cloudy-day sensors; pressure sensors; smoke detectors; carbon monoxide detectors; air-quality sensors; motion sensors; security sensors; proximity sensors; fixture sensors; partition sensors; keypads; kinetic or solar-powered remote controls; key fobs; cell phones; smart phones; tablets; personal digital assistants; personal computers; laptops; timeclocks; audio-visual controls; safety devices; power monitoring devices (such as power meters, energy meters, utility submeters, utility rate meters, etc.); central control transmitters; residential, commercial, or industrial controllers; or any combination of these input devices.

Figure 2A:
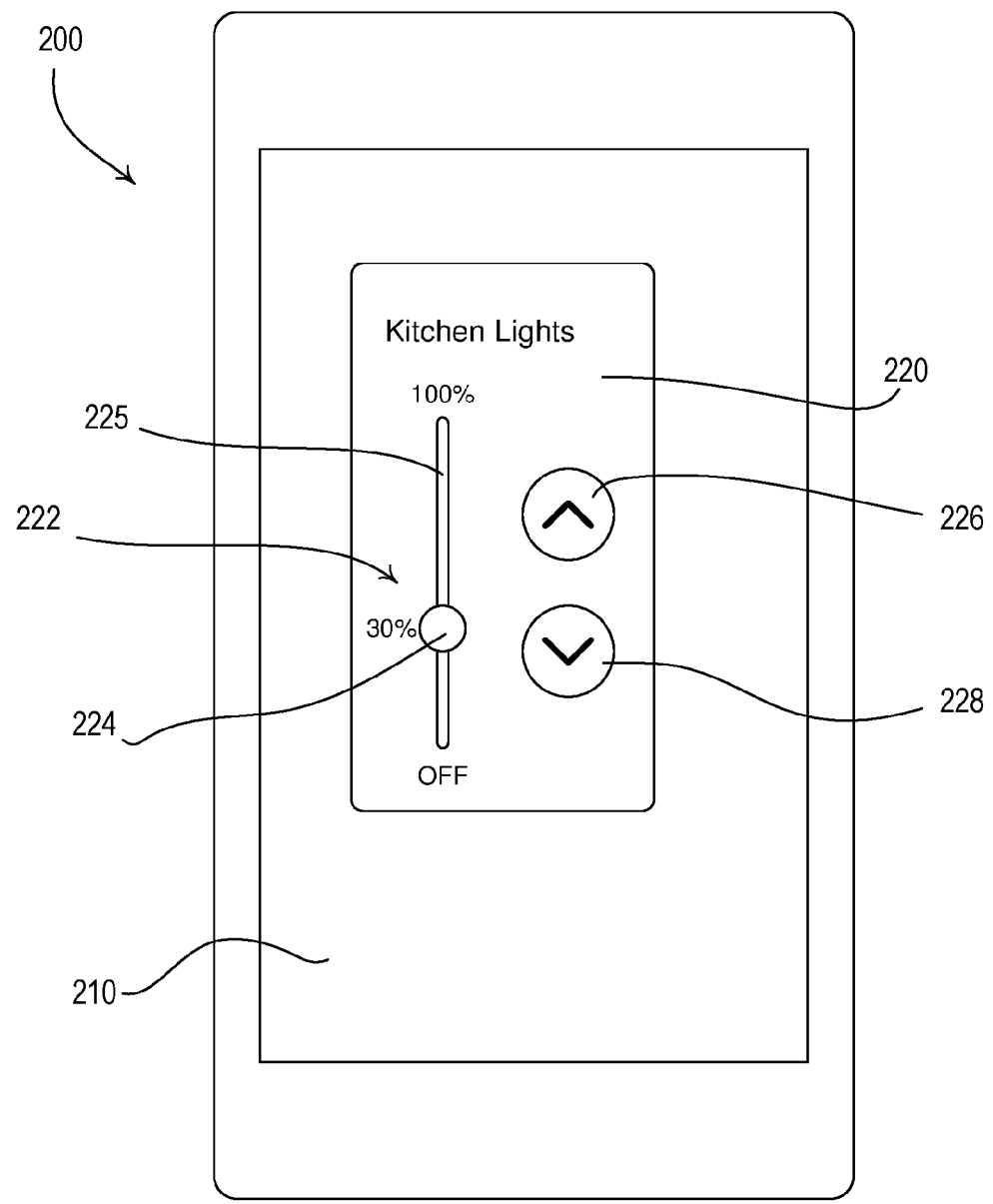
FIG. 2A illustrates a front view of an example network device illustrating a load control adjustment screen for providing fine tune adjustment of a lighting load.

FIG. 2A illustrates a simplified front view of an example network device 200 (e.g., the network device 170 of the load control system 100 shown in FIG. 1). The network device 200 may comprise a user interface having a touch-responsive visual display 210. The network device 200 may further comprise a touch sensitive element (e.g., a capacitive touch pad) displaced overtop the visual display 210 to allow the network device 200 to display soft controls (e.g., soft buttons) that may be actuated by a user. The network device 200 may be configured to provide a plurality of different soft controls to the user on the visual display 210 to allow the user to monitor and/or adjust operating characteristics and parameters of a load control system (e.g., the load control system 100). The network device 200 may comprise hard buttons, e.g., physical buttons (not shown).

The network device 200 may display a load control adjustment screen 220 for controlling an electrical load via a load control device. For example, the load control adjustment screen 220 may be a lighting zone adjustment window for controlling a zone of lighting. The zone of lighting may include one or more controlled lighting loads, such as the light bulb 112 of the load control system 100 shown in FIG. 1. The load control adjustment screen 220 may have a slider control 222 (e.g., a vertically-arranged linear slider control) having an adjustment knob 224 arranged along a slot 225. A user may press and hold the adjustment knob 224 with a finger and slide the finger (e.g., up and down) to move the adjustment knob 224 to adjust a parameter (e.g., the intensity) of the controlled lighting load. The slider control 222 may provide fine tune adjustment of the parameter (e.g., the intensity) of the controlled lighting load. For example, the fine tune adjustment provided by the network device may adjust the intensity of the controlled lighting load by a lesser percentage than provided by the wearable wireless device. The fine tune adjustment may adjust the parameter (e.g., the intensity) in smaller increments than enabled by the wearable wireless device. For example, the fine tune adjustments may adjust the parameter (e.g., the intensity) in increments of 1% steps, 3% steps, 5% steps, etc. The percentage of change in the load control adjustments made on the wearable wireless device may be a multiple of the percentage of change available on the network device. For example, the wearable wireless device may control a dimming level in increments that are ten times greater than the increments of change that may be enabled by the network device. The network device may be able to make fine-tune adjustments of the dimming level at 1% increments, while the wearable wireless device may control the dimming level in 10%, 25%, or 33% increments.

Though shown as a vertical slider control 222, the slider control 222 may be horizontally arranged, or circular. The load control adjustment screen 220 may comprise a raise button 226 and/or a lower button 228. Actuations of the raise button 226 and the lower button 228 may respectively increase and decrease the intensity of the controlled lighting load by a predetermined amount of change in the light caused by the phone, $\Delta L_{PHONE}$. For example, the actuation of the raise button 226 and the lower button 228, respectively, may change the intensity of the controlled lighting load by 1% to provide fine tune adjustment. Though shown as soft buttons, the raise button 226 and/or the lower button 228 may be physical hard buttons.

Figure 2B:
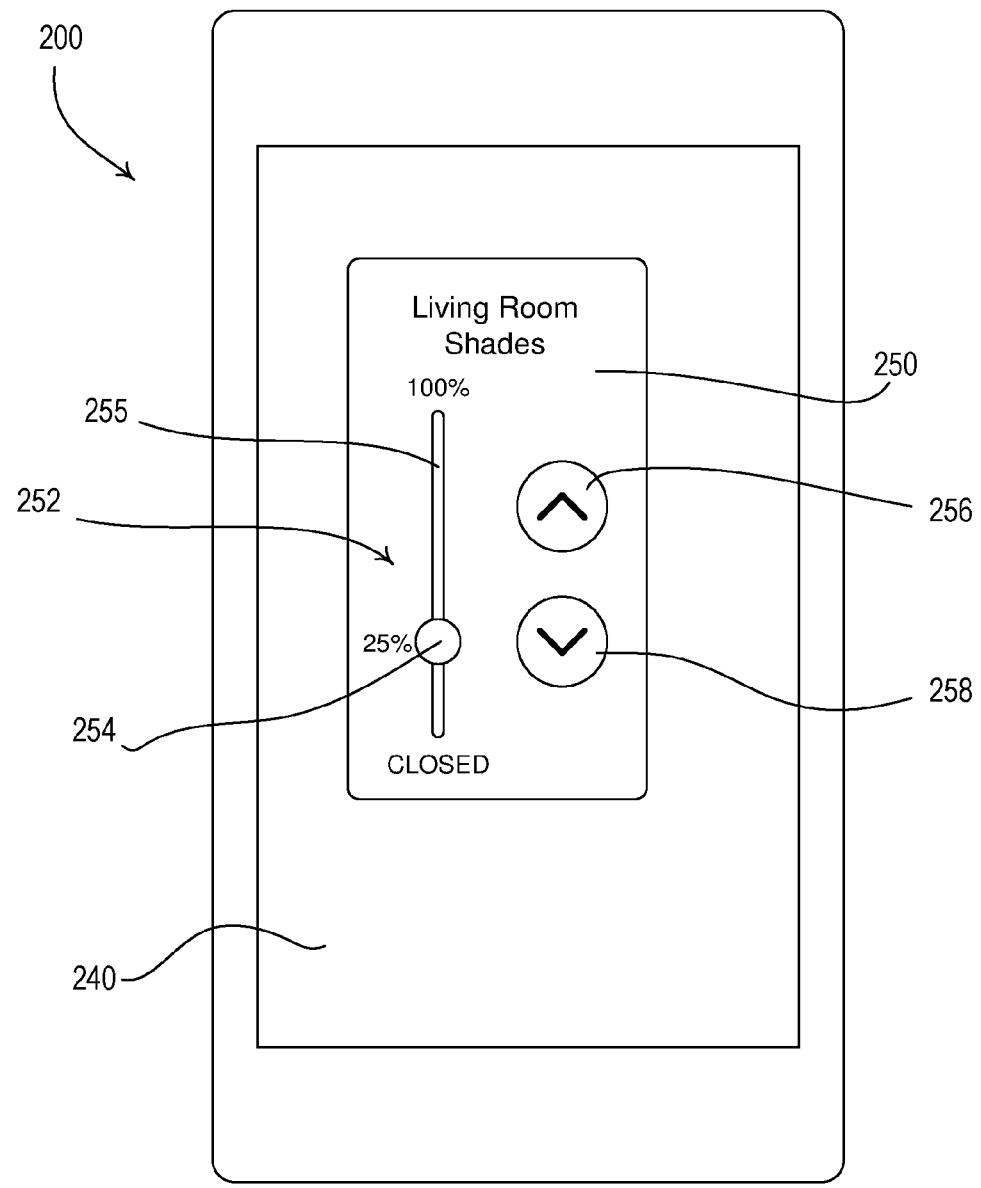
FIG. 2B illustrates a front view of an example network device illustrating a load control adjustment screen for providing fine tune adjustment of a motorized window treatment.

As shown in FIG. 2B, the network device 200 may display a shading zone adjustment window. For example, the network device 200 may display a shading zone adjustment window for providing fine tune adjustment of a parameter (e.g., the position) of a covering material of a motorized window treatment (e.g., the motorized window treatment 130 of the load control system 100 of FIG. 1).

The network device 200 may display a load control adjustment screen 250 for controlling an electrical load via a load control device. For example, the load control adjustment screen 250 may be a shading zone adjustment window for controlling a zone of shading. The zone of shading may include one or more motorized window treatments, such as the motorized window treatment 130 of the load control system 100 shown in FIG. 1. The load control adjustment screen 250 may have a slider control 252 (e.g., a vertically-arranged linear slider control) having an adjustment knob 254 arranged along a slot 255. A user may press and hold the adjustment knob 254 with a finger and slide the finger (e.g., up and down) to move the adjustment knob 254 to adjust a parameter (e.g., the position) of the motorized window treatments. The slider control 252 may provide fine tune adjustment of the parameter (e.g., the position) of the motorized window treatments. For example, the fine tune adjustment provided by the network device may adjust the position of the motorized window treatments by a lesser percentage than provided by the wearable wireless device. The fine tune adjustment may adjust the parameter (e.g., the position) of the motorized window treatments in smaller increments than enabled on the wearable wireless device. For example, the fine tune adjustments may adjust the parameter (e.g., the position) of the motorized window treatments in increments of 1%, 5% steps, 10% steps, 15% steps, 25% steps, etc. The percentage of change in the adjustments made on the wearable wireless device may be a multiple of the percentage of change available on the network device. For example, the wearable wireless device may control the motorized window treatment to adjust the position of the covering material in increments that are ten times greater than the increments of change that may be enabled by the network device. The network device may be able to make fine-tune adjustments of the covering material at 1% increments, while the wearable wireless device may control the level of the covering material in 10%, 25%, or 33% increments.

Though shown as a vertical slider control 252, the slider control 252 may be horizontally arranged, or circular. The load control adjustment screen 250 may comprise a raise button 256 and/or a lower button 258. Actuations of the raise button 256 and the lower button 258 may respectively open and close the motorized window treatments by a predetermined amount. For example, the actuation of the raise button 256 and the lower button 258, respectively, may change the opening of the motorized window treatments 10%, to provide fine tune adjustment. Though shown as soft buttons, the raise button 256 and/or the lower button 258 may be physical hard buttons.

FIGS. 3A-3E illustrate front views of an example wearable wireless device 300 (e.g., the wearable wireless device 180 of the load control system 100 shown in FIG. 1). The wearable wireless device 300 may comprise a wrist band 310 and a user interface having a touch-responsive visual display 320 with a touch sensitive element (e.g., a capacitive touch pad) displaced overtop the visual display. The wearable wireless device 300 may be configured to display a plurality of different soft controls (e.g., soft buttons) on the visual display 320 to allow the user to monitor and adjust different operating characteristics and parameters of a load control system (e.g., the load control system 100). The wearable wireless device 300 may comprise a dial 312, which may be rotated by the user, e.g., to scroll through displayed soft controls and/or options on the visual display 320.

As shown in FIGS. 3A-3E, the wearable wireless device 300 may display a load control adjustment screen 330 (e.g., a lighting zone adjustment screen) for controlling one or more zones of lighting (e.g., controlled lighting loads, such as the light bulbs 112, 122 of the load control system 100). The load control adjustment screen 330 may display a lighting zone 340 providing feedback. The feedback may include one or more icons (e.g., a meter). The feedback may include a linear intensity meter 342 comprising a plurality of segments. Each of the number of segments of the intensity meter may represent a portion of a range (e.g., a dimming range) of a load control device (e.g., a dimmer switch). Each portion of the dimming range may be defined by a minimum intensity and a maximum intensity. For example, the linear intensity meter 342 may comprise four segments as shown in FIGS. 3A-3E. The lighting zone 340 may comprise a zone name 344 for describing the lighting load(s) controlled by the lighting zone 340. For example, the zone name 344 may comprise the text "Kitchen Lights." The linear intensity meter 342 may extend between a lights-off icon 346 on the left and a lights-on icon 348 on the right. The lights-off icon 346 may be indicated by a dark light bulb or other indicator. The lights-on icon may be indicated by an illuminated light bulb or other indicator.

Figure 3A:
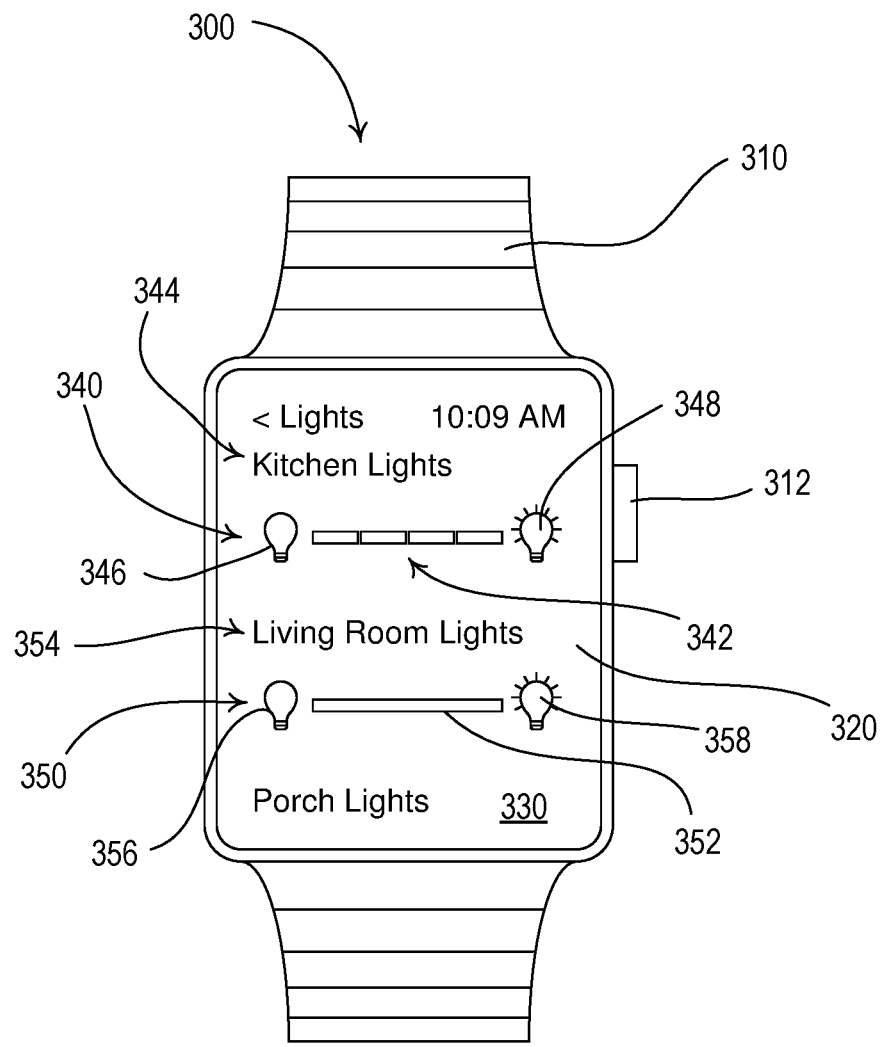
FIGS. 3A-3E illustrate front views of an example wearable wireless device illustrating a lighting zone adjustment screen for providing load control adjustment of a lighting load.
Figure 3B:
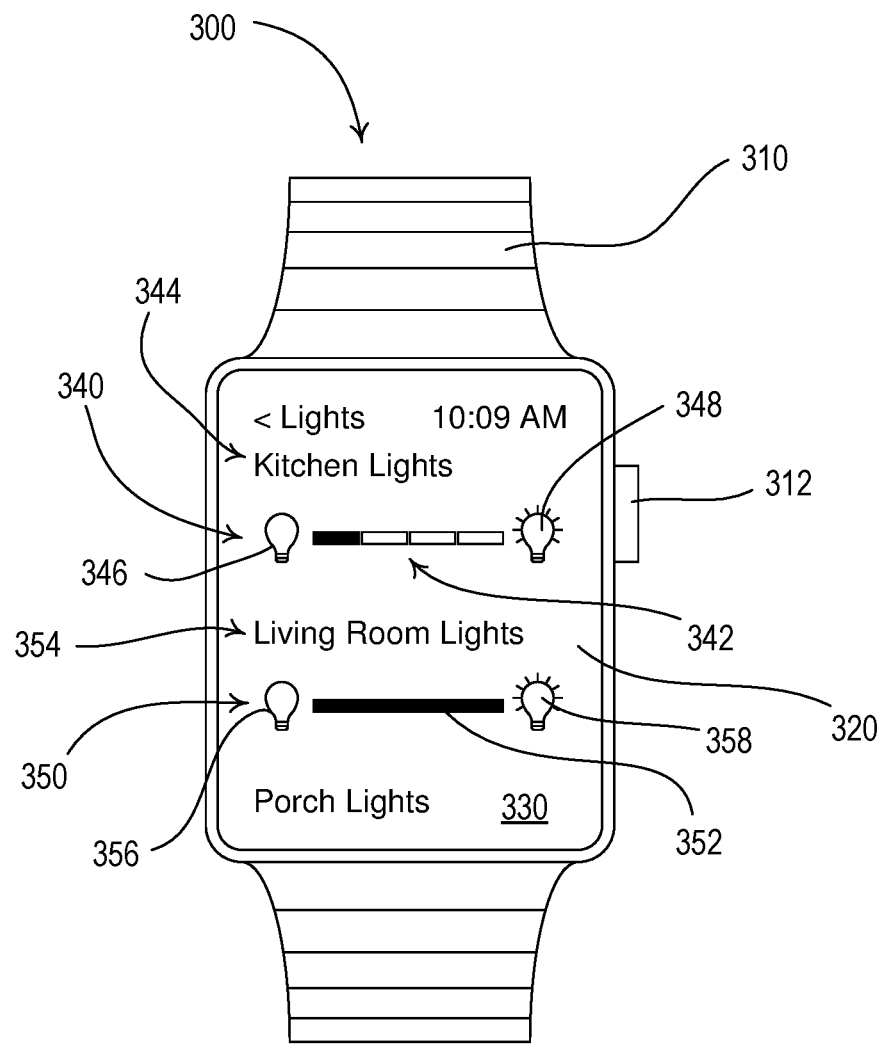
Figure 3C:
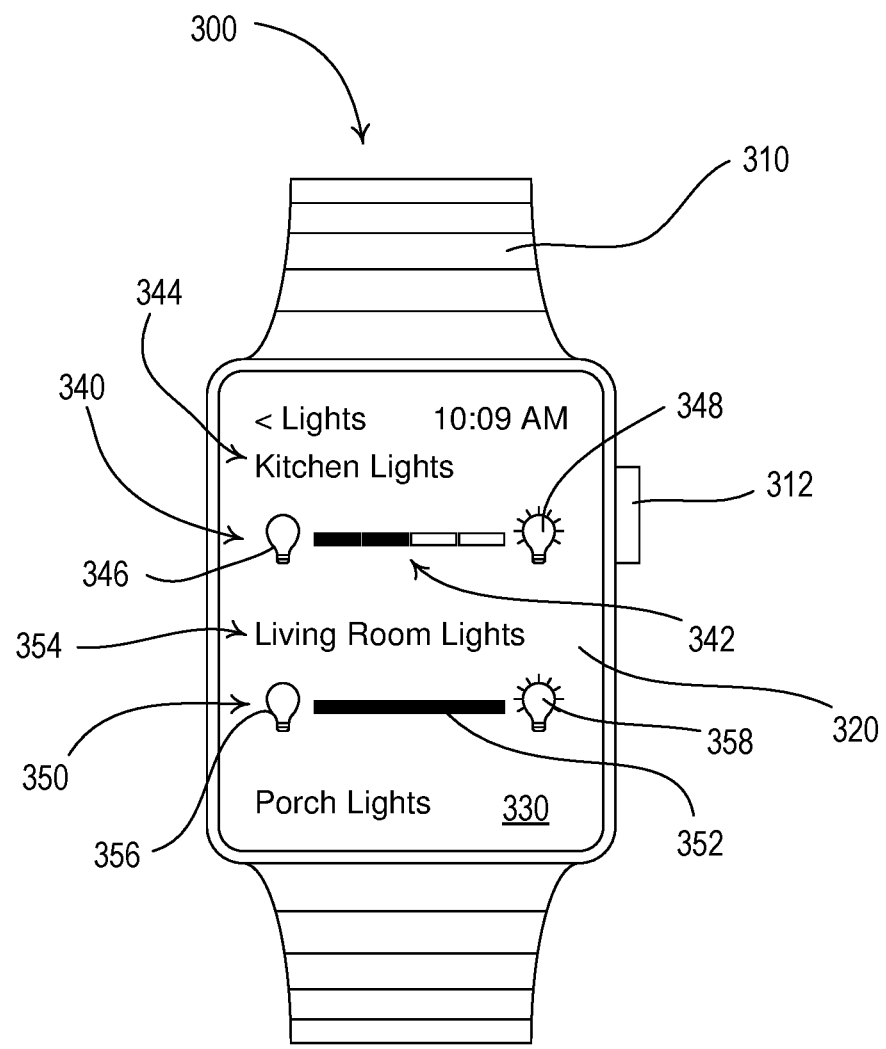
Figure 3D:
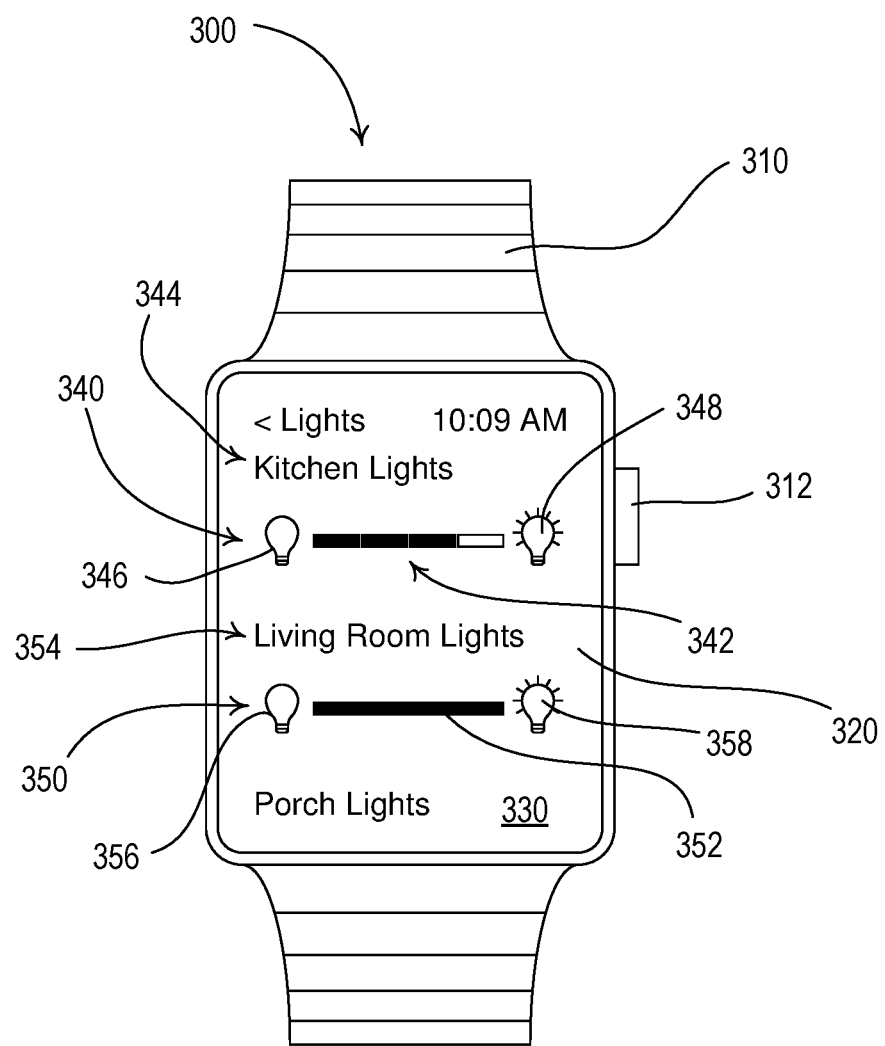
Figure 3E:
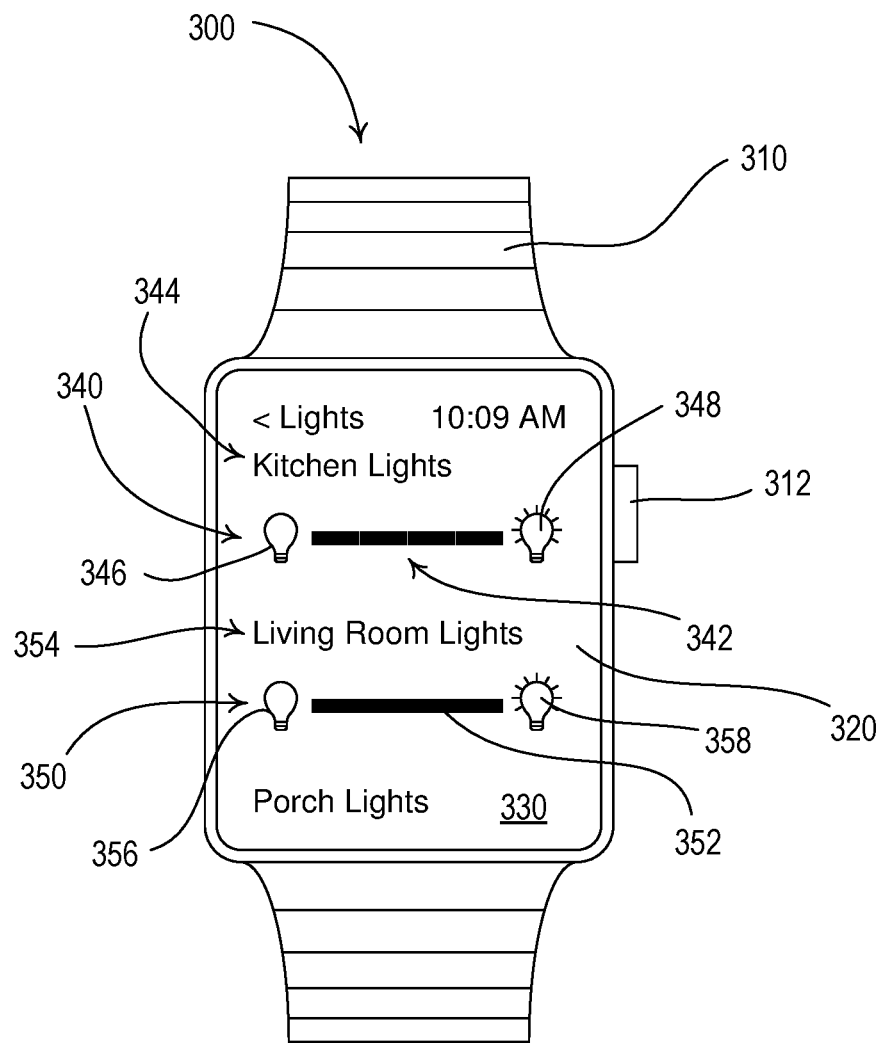

One or more of the segments of the of the linear intensity meter 342 may be highlighted (e.g., made brighter or a different color) to indicate the intensity of the lighting zone 340. For example, when the lighting zone 340 is off (e.g., controlled to an intensity of 0%), none of the segments of the linear intensity meter 342 may be highlighted as shown in FIG. 3A. When the intensity of the lighting zone 340 is between, for example, 1% and 25%, the segment of the linear intensity meter 342 closest to the lights-off icon 346 may be highlighted as shown in FIG. 3B. When the intensity of the lighting zone 340 is between, for example, 26% and 50%, the two segments of the linear intensity meter 342 closest to the lights-off icon 346 may be highlighted as shown in FIG. 3C. When the intensity of the lighting zone 340 is between, for example, 51% and 75%, the three segments of the linear intensity meter 342 closest to the lights-off icon 346 may be highlighted as shown in FIG. 3D. When the intensity of the lighting zone 340 is between, for example, 76% and 100%, each of the segments of the linear intensity meter 342 may be highlighted as shown in FIG. 3E.

As shown in FIGS. 3A-3E, multiple segments of the linear intensity meter 342 may be highlighted in series from the lights-off icon 346 to a highest (e.g., right-most) highlighted segment to indicate intensities greater than 25% (e.g., as a "bar graph"). Each segment may be unhighlighted to represent an intensity of 0% (as shown in FIG. 3A), one segment may be highlighted to represent an intensity between 1% and 25%, two segments may be highlighted to represent an intensity between 26% and 50%, three segments may be highlighted to represent an intensity between 51% and 75%, and four segments may be highlighted to represent an intensity between 76% and 100%. Also, or alternatively, one of the segments of the linear intensity meter 342 may be independently illuminated to indicate the intensity when the lighting zone 340 is on. For example, the highest highlighted segment of the intensity meter 342 may be independently highlighted to indicate the intensity when the lighting zone 340 is on. For example, the segment next to the lights-off icon 346 may be independently highlighted to represent an intensity between 1% and 25%, the second segment from the lights-off icon 346 may be independently highlighted to represent an intensity between 26% and 50%, the third segment from the lights-off icon 346 may be independently highlighted to represent an intensity between 51% and 75%, and the fourth segment from the lights-off icon 346 (e.g., the segment next to the lights-on icon 348) may be independently highlighted to represent an intensity between 76% and 100%.

The user may be able to actuate the touch-responsive visual display 320 when the load control adjustment screen 330 is being displayed. For example, the user may be able to actuate the touch-responsive visual display 320 when the load control adjustment screen 330 is being displayed in order to adjust a parameter (e.g., the intensities) of one or more of the lighting zones. The user may be able to actuate the touch-responsive visual display 320 adjacent to one of the lighting zones to adjust the parameter (e.g., the intensity) of that lighting load. For example, the user may be able to actuate the touch-responsive visual display 320 within a predetermined distance of the intensity meter 342, the zone name 344, the lights-off icon 346, and the lights-on icon 348 of the lighting zone 340 in order to control that lighting zone. Actuations of the left side of the touch-responsive visual display 320 adjacent to the lighting zone 340 (e.g., on the lights-off icon 346) may decrease the intensity of the controlled lighting load. Actuations of the right side of the touch-responsive visual display 320 adjacent to the lighting zone 340 (e.g., on the lights-on icon 348) may increase the intensity of the controlled lighting load. In other words, the left and right sides of the touch-responsive visual display 320 adjacent to the lighting zone 340 may operate as lower and raise buttons, respectively, for the controlled lighting load.

The touch-responsive visual display 320 of the wearable wireless device 300 may be smaller than a visual display of a network device (e.g., a smart phone). Because the touch-responsive visual display 320 of the wearable wireless device 300 may be smaller than a visual display of a network device (e.g., a smart phone), actuations of the left and right sides of the touch-responsive visual display 320 adjacent to the lighting zone 340 may cause greater changes in the intensity of the controlled lighting load than the fine tune adjustment provided by the network device (e.g., smart phone). For example, actuation of the visual display of the wearable wireless device may adjust the intensity of the controlled lighting load by a greater percentage than the fine tune adjustment provided by the network device. The greater changes in the intensity of the controlled lighting load may provide quick adjustment of the intensity of the lighting load between, for example, 0% and 100%. For example, actuations of the left and right sides of the touch-responsive visual display 320 adjacent to the lighting zone 340 may adjust the intensity of the controlled lighting load to one of a plurality of preset intensities. The preset intensities may, for example, be 0%, 25%, 50%, 75%, and 100% to correspond to the maximum intensity of each segment of the linear intensity meter 342 shown in FIGS. 3A-3E.

In response to an actuation to increase a parameter (e.g., the intensity) of the controlled lighting load, the parameter (e.g., intensity) may be adjusted to a preset parameter (e.g., intensity) that may cause a segment (e.g., the next segment) on the linear intensity meter 342 to be highlighted. For example, if the intensity is between 26% and 50% and the touch-responsive visual display 320 is actuated to raise the intensity of the lighting load, the intensity of the lighting load may be controlled to 75% and three of the segments of the linear intensity meter 342 may be highlighted, as shown in FIG. 3D. In response to an actuation to decrease the parameter (e.g., intensity) of the controlled lighting load, the intensity may be adjusted to the preset intensity that causes the highest (e.g., right-most) highlighted segment of the linear intensity meter 342 not to be highlighted. For example, if the intensity is between 26% and 50% and the touch-responsive visual display 320 is actuated to lower the intensity of the lighting load, the intensity of the lighting load may be controlled to 25% and one of the segments of the linear intensity meter 342 may be highlighted as shown in FIG. 3B. An example of controlling the lighting loads from the wearable wireless device 300 is provided in the Table 1.0.

TABLE 1.0

| | Actuation to Raise Intensity results in . . . | Actuation to Lower Intensity results in . . . |
|---|---|---|
| Initial intensity at 0% | Intensity controlled to 25% and one segment highlighted. | Intensity controlled to 0% and no segments highlighted. |
| Initial intensity between 1% and 25% | Intensity controlled to 50% and two segments highlighted. | Intensity controlled to 0% and no segments highlighted. |
| Initial intensity between 26% and 50% | Intensity controlled to 75% and three segments highlighted. | Intensity controlled to 25% and one segment highlighted. |
| Initial intensity between 51% and 75% | Intensity controlled to 100% and four segments highlighted. | Intensity controlled to 50% and two segments highlighted. |
| Initial intensity between 76% and 100% | Intensity controlled to 100% and four segments highlighted. | Intensity controlled to 75% and three segments highlighted. |

Also, or alternatively, there may be multiple preset parameters (e.g., intensities) for controlling the lighting load within a single segment of the intensity) meter 342. For example, the linear intensity meter 342 may have four segments, but the lighting load may be controlled to more preset intensities, for example, at 0%, 12.5%, 25%, 37.5%, 50%, 62.5%, 75%, 87.5%, and 100%.

The linear intensity meter 342 may have a different number of segments. For example, the linear intensity meter 342 may have three segments. For example, the preset intensities may be 0%, 33%, 66%, and 100%. The linear intensity meter 342 may have five segments. For example, the preset intensities may be 0%, 20%, 40%, 60%, 80%, and 100%.

To provide fine tune adjustment of the controlled lighting load from the wearable wireless device 300, the user may press and/or hold the lighting zone 342 on the touch-responsive visual display 320 to highlight the entire zone. The user may rotate (e.g., after pressing and/or holding the lighting zone 342) the dial 312 to adjust the parameter (e.g., intensity) of the lighting load by smaller amounts (e.g., in 1% steps). The touch-responsive visual display 320 may display a numeral indicating the resulting intensity of the lighting load when controlled by the dial 312.

The intensity of the controlled lighting load may be adjusted by a predetermined amount of change in the lighting level caused by the watch, $\Delta L_{WATCH}$, e.g., rather than controlling the intensity of the lighting zone 340 to preset intensities. The intensity of the controlled lighting load may be adjusted by a predetermined amount in response to actuations of the left and right sides of the touch-responsive visual display 320. For example, actuations of the left and right side of the touch-responsive visual display 320 adjacent to the lighting zone 340 may respectively decrease and increase the intensity of the controlled lighting load by the predetermined amount $\Delta L_{WATCH}$. The predetermined amount $\Delta L_{WATCH}$ may be a substantial portion of the total dimming range of the controlled lighting load. For example, the predetermined amount $\Delta L_{WATCH}$ may be 25% to correspond with the spacing between the intensities indicated by the segments of the linear intensity meter 342 as shown in FIGS. 3A-3E. The predetermined amount $\Delta L_{WATCH}$ may have a different value if the linear intensity meter 342 has a different number of segments. For example, the predetermined amount $\Delta L_{WATCH}$ may be approximately 33.33% if the linear intensity meter 342 has three segments or 20% if the linear intensity meter 342 has five segments.

As shown in FIGS. 3A-3E, the load control adjustment screen 330 may display a lighting zone 350 having a status indicator 352. The status indicator 352 may comprise a single linear segment extending between a lights-off icon 356 on the left and a lights-on icon 358 on the right. The lighting zone 350 may comprise a zone name 354 for describing the lighting load controlled by the lighting zone 350. For example, the zone name 354 may have the text "Living Room Lights."

The lighting zone 350 may comprise a switched lighting load. The status indicator 352 may be highlighted to indicate that the controlled lighting load is on (as shown in FIGS. 3B-3E) and may be unhighlighted to indicate that the controlled lighting load is off (as shown in FIG. 3A). The user may be able to actuate the touch-responsive visual display 320 adjacent to one of the lighting zones to adjust the intensity of that lighting load. For example, the user may be configured to actuate the touch-responsive visual display 320 adjacent to the lighting zone 350 (e.g., within a predetermined distance of the status indicator 352, the zone name 354, the lights-off icon 356, and/or the lights-on icon 358 of the lighting zone 350) in order to control that lighting zone. Actuations of the left side of the touch-responsive visual display 320 adjacent to the lighting zone 350 (e.g., on the lights-off icon 356) may turn off the controlled lighting load. Actuations of the right side of the touch-responsive visual display 320 adjacent to the lighting zone 350 (e.g., on the lights-on icon 358) may turn on the controlled lighting load.

The load control adjustment screen 330 may display additional electrical loads, such as additional lighting zones and/or motorized window treatments. For example, the user may scroll through the lighting zones on the load control adjustment screen 330 by swiping (e.g., swiping up and down) on the touch-responsive visual display 320, and/or by rotating the dial 312.

Figure 4:
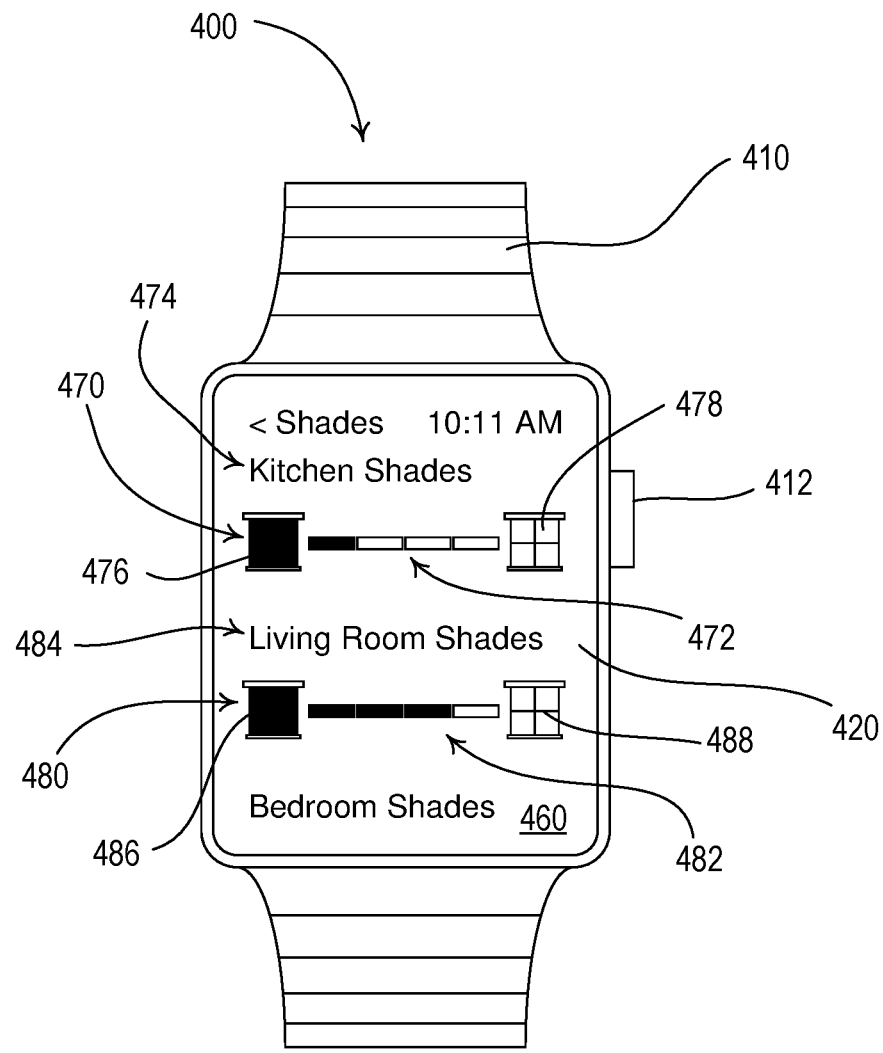
FIG. 4 illustrates a front view of an example wearable wireless device comprising a shading zone adjustment screen for providing load control adjustment of a motorized window treatment.

FIG. 4 illustrates a front view of an example wearable wireless device 400 (e.g., smart watch) comprising another load control adjustment screen 460 (e.g., a shading zone adjustment screen) for controlling a parameter (e.g., the positions) of covering materials of one or more zones of motorized window treatments (e.g., the motorized window treatment 130 of the load control system 100). The wearable wireless device 400 may comprise a wrist band 410 and a user interface having a touch-responsive visual display 420 with a touch sensitive element (e.g., a capacitive touch pad) displaced overtop the visual display. The wearable wireless device 400 may be configured to display a plurality of different soft controls (e.g., soft buttons) on the visual display 420 to allow the user to monitor and adjust different operating characteristics and parameters of a load control system (e.g., the load control system 100). The wearable wireless device 400 may comprise a dial 412, which may be rotated by the user, e.g., to scroll through displayed soft controls and/or options on the visual display 420.

The load control adjustment screen 460 may display multiple shade zones, such as shade zones 470, 480 as shown in FIG. 4. The shade zones 470, 480 may provide feedback. The feedback may include one or more icons (e.g., a meter). The feedback may include respective linear position meters 472, 482 that include a plurality of segments (e.g., four segments as shown in FIG. 4). Each of the number of segments of the meter may represent a portion of a range (e.g., a covering material position range) of a load control device (e.g., a motorized window treatment). Each portion of the range may be defined by a minimum position and a maximum position. The shade zones 470, 480 may comprise respective zone names 474, 484 for describing the motorized window treatments controlled by the shade zones 470, 480. Each linear position meter 472, 482 may extend between a respective fully-closed icon 476, 486 on the left and a respective fully-open icon 478, 488 on the right. The user may scroll through the shade zones on the load control adjustment screen 460 by swiping up and down on the touch-responsive visual display 420, or by rotating the dial 412.

One or more of the segments of each of the linear position meters 472, 482 may be highlighted to indicate the position of the covering material of the respective shade zones 470, 480 (e.g., in a similar manner as the linear intensity meter 342 is highlighted to indicate the intensity of the lighting zone 340). For example, when the shade zone 470 is fully closed (e.g., at 0% open), each of the segments of the linear position meter 472 may be unhighlighted. When the shade zone 470 is between, for example, 1% and 25% open, the segment of the linear position meter 472 closest to the fully-closed icon 476 may be highlighted as shown in FIG. 4. When the shade zone 470 is between, for example, 26% and 50% open, the two segments of the linear position meter 472 closest to the fully-closed icon 476 may be highlighted. When the shade zone 470 is between, for example, 51% and 75% open, the three segments of the linear position meter 472 closest to the fully-closed icon 476 may be highlighted (e.g., as shown on the shade zone 380 in FIG. 4). When the shade zone 470 is between, for example, 76% and 100% open, each of the segments of the linear position meter 472 may be highlighted.

As shown in FIG. 4, multiple segments of the linear position meter 472 may be highlighted in series from the fully-closed icon 476 to a highest (e.g., right-most) highlighted segment to indicate positions greater than 25% (e.g., as a "bar graph"). Each segment may be unhighlighted to represent a position of 0%, one segment may be highlighted to represent a position between 1% and 25%, two segments may be highlighted to represent a position between 26% and 50%, three segments may be highlighted to represent a position between 51% and 75%, and four segments may be highlighted to represent a position between 76% and 100%. Also, or alternatively one of the segments of the linear position meter 472, 482 may be independently illuminated to indicate the position of the shade zones 470, 480. For example, the highest highlighted segment of the position meters 472, 482 may be independently highlighted to indicate the position of the shade zones 470, 480. For example, the segment next to the fully-closed icon 476 may be independently highlighted to represent a position between 1% and 25%, the second segment from the fully-closed icon 476 may be independently highlighted to represent a position between 26% and 50%, the third segment from the fully-closed icon 476 may be independently highlighted to represent a position between 51% and 75%, and the fourth segment from the fully-closed icon 476 (e.g., the segment next to the fully-open icon 478) may be independently highlighted to represent a position between 76% and 100%.

The user may be able to actuate the touch-responsive visual display 420 when the load control adjustment screen 460 is being displayed (e.g., adjacent to one of the shade zones). For example, the user may be able to actuate the touch-responsive visual display 420 when the load control adjustment screen 460 is being displayed in order to adjust the parameter (e.g., the positions) of the motorized window treatments. The user may be able to actuate the touch-responsive visual display 420 within a predetermined distance of the position meter 472, the zone name 474, the fully-closed icon 476, and the fully-open icon 478 of the shade zone 470 in order to control the shade zone. Actuations of the left side of the touch-responsive visual display 420 adjacent to the shade zone 470 (e.g., on the fully-closed icon 476) may lower the position of the covering material of the controlled motorized window treatment. Actuations of the right side of the touch-responsive visual display 420 adjacent to the shade zone 470 (e.g., on the fully-open icon 478) may raise the position of the covering material of the controlled motorized window treatment. For example, the left and right sides of the touch-responsive visual display 420 adjacent to the shade zone 470 may operate as lower buttons and raise buttons, respectively, for the controlled motorized window treatment.

Actuations of the left and right sides of the touch-responsive visual display 420 adjacent to the shade zones 470, 480 of the wearable wireless device 400 may cause greater changes in the positions of the covering materials of the controlled motorized window treatments than the fine tune adjustment provided by the network device (e.g., smart phone) to provide quick adjustment of the positions of the covering materials between, for example, fully closed and fully open. For example, actuations of the left and right sides of the touch-responsive visual display 420 adjacent to the shade zone 470 may adjust the position of the covering material of the controlled motorized window treatment to one of a plurality of preset positions. The preset positions may be, for example, 0%, 25%, 50%, 75%, and 100% open to correspond to the maximum position of each segment of the linear position meter 472 shown in FIG. 4.

In response to an actuation to raise the position of the covering material, the position may be adjusted to the preset parameter (e.g., position) that causes the next segment on the respective linear position meter 472, 482 to be highlighted. For example, if the position of the shade zone 480 is between 26% and 50% open and the touch-responsive visual display 420 is actuated to raise the position of the covering material, the position of the covering material may be controlled to 75% open and three of the segments of the linear position meter 482 may be highlighted as shown in FIG. 4. In response to an actuation to lower the position of the covering material, the position of the covering material may be adjusted to the preset position that causes the highest (e.g., right-most) highlighted segment of the respective linear intensity meter 472, 482 not to be highlighted. For example, if the position of the shade zone 470 is between 26% and 50% open and the touch-responsive visual display 420 is actuated to lower the position of the covering material, the position of the covering material may be controlled to 25% open and one of the segments of the linear position meter 472 may be highlighted as shown in FIG. 4. An example of controlling the motorized window treatments from the wearable wireless device 400 is provided in Table 2.0.

TABLE 2.0

| | Actuation to Raise Position results in . . . | Actuation to Lower Position results in . . . |
|---|---|---|
| Initial position at 0% open | Position controlled to 25% open and one segment highlighted. | Position controlled to 0% open and no segments highlighted. |
| Initial position between 1% and 25% open | Position controlled to 50% open and two segments highlighted. | Position controlled to 0% open and no segments highlighted. |
| Initial position between 26% and 50% open | Position controlled to 75% open and three segments highlighted. | Position controlled to 25% open and one segment highlighted. |
| Initial position between 51% and 75% open | Position controlled to 100% open and four segments highlighted. | Position controlled to 50% open and two segments highlighted. |
| Initial position between 76% and 100% open | Position controlled to 100% open and four segments highlighted. | Position controlled to 75% open and three segments highlighted. |

To provide fine tune adjustment of the parameter (e.g., positions) of the covering materials of the controlled motorized window treatments from the wearable wireless device 400, the user may press and hold the respective shade zone 472, 482 on the touch-responsive visual display 420 to highlight the entire zone, and/or the user may rotate the dial 412 to adjust the position of the covering material by smaller amounts (e.g., in 1% steps). The touch-responsive visual display 420 may display a numeral indicating the resulting position of the motorized window treatment when controlled by the dial 412.

While the load control adjustment screens 330, 460 shown in FIGS. 3A-4 provide control of lighting loads and motorized window treatments, the load control adjustment screens may be used to control other parameters, such as, for example, the amount of power delivered to an electrical load and/or appliance, the color temperature of a lighting load (e.g., a light-emitting diode (LED) light source), the setpoint temperature of a thermostat and/or heating, ventilation, and air-conditioning (HVAC) controller, and/or the volume of a speaker and/or audio/visual device.

Figure 5:
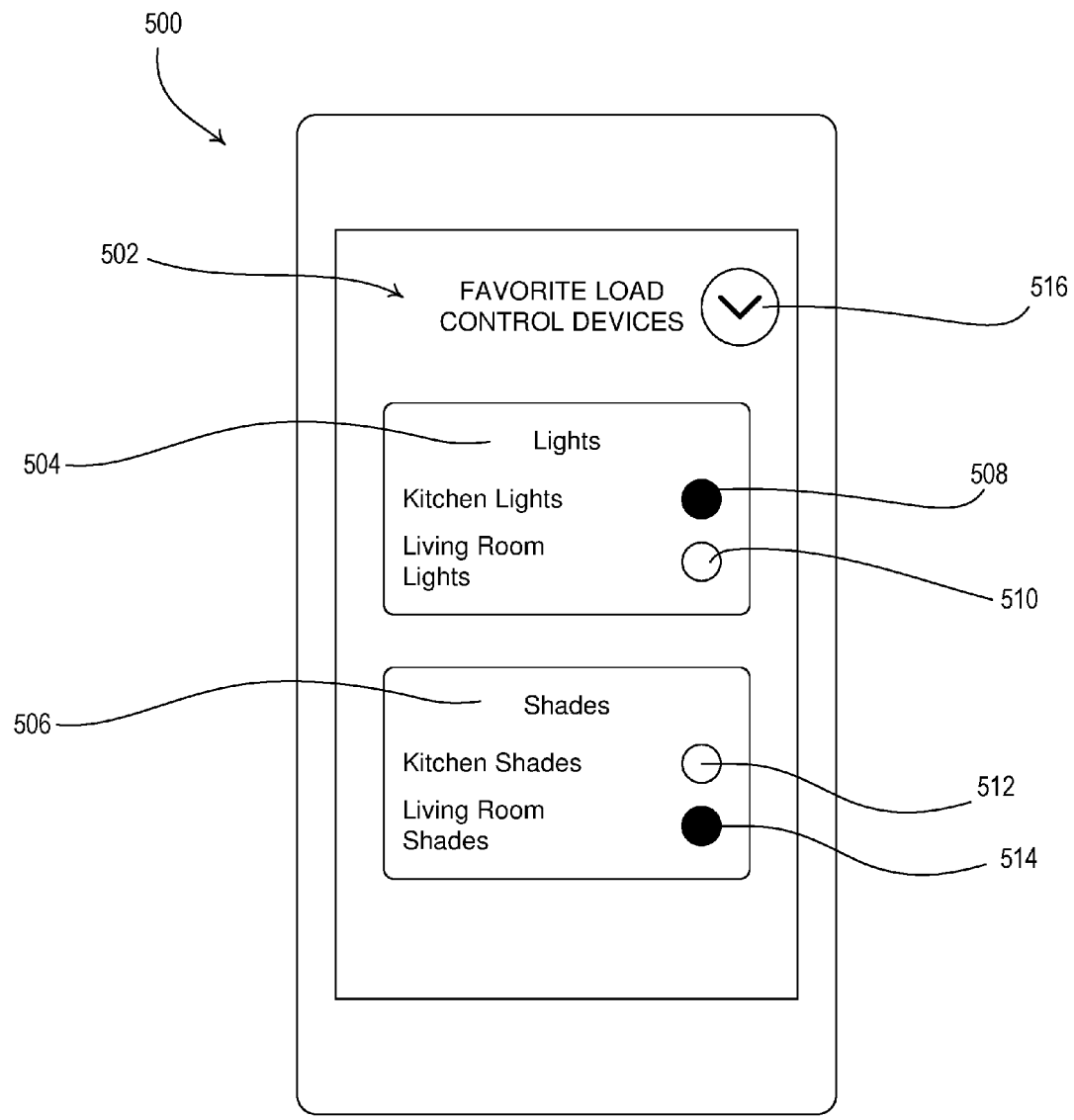
FIG. 5 illustrates a front view of an example network device illustrating a configuration screen for configuring a wearable wireless device with load control devices for control.

FIG. 5 is a front view of an example network device 500 (e.g., the network device 170 of the load control system 100 shown in FIG. 1). Network device 500 may be used for configuring the wearable wireless device (e.g., the wearable wireless device 180 of the load control system 100 shown in FIG. 1). The network device 500 may be used for configuring the load control devices (e.g., the lighting loads, motorized window treatments, etc.) that may be accessed by the wearable wireless device. For example, the network device 500 may be used to configure the wearable wireless device so that the wearable wireless device may control predetermined load control devices. The predetermined load control devices may be identified as favorite load control devices.

Configuration category 502 may provide the title of the configuration category that the network device 500 may provide. For example, the network device 500 may provide a configuration category 502 of favorite load control devices, most used load control devices, connected and/or disconnected load control devices, load control devices newly added to the load control system, etc. The user may select the configuration category 502 from one or more predetermined configuration categories. For example, the user may select the configuration category 502 from a drop down list button 516.

The network device 500 may display one or more configuration results. For example, as shown in FIG. 5, the network device 500 may display two categories of favorite load control devices (e.g., Lights 504 and Shades 506). The user of network device 500 may select from the predefined load control device favorites, to configure the wearable wireless device. The user may select the predefined load control devise using selection buttons, such as Kitchen Lights button 508, Living Room Lights button 510, Kitchen Shades button 512, Living Room Shades button 514, etc. Upon selection, the buttons may visibly change. For example, selected buttons may change colors, shapes, etc. As shown on FIG. 5, Kitchen Lights button 508 and Living Room Shades button 514 have been selected. Selected load control devices may be configured for use by the wearable wireless device. For example, selected load control devices Kitchen Lights button 508 and Living Room Shades button 514 may be considered favorites of the user of the wearable wireless device and/or the wearable wireless device may be configured to access the kitchen lights and living room shades.

Figure 6:
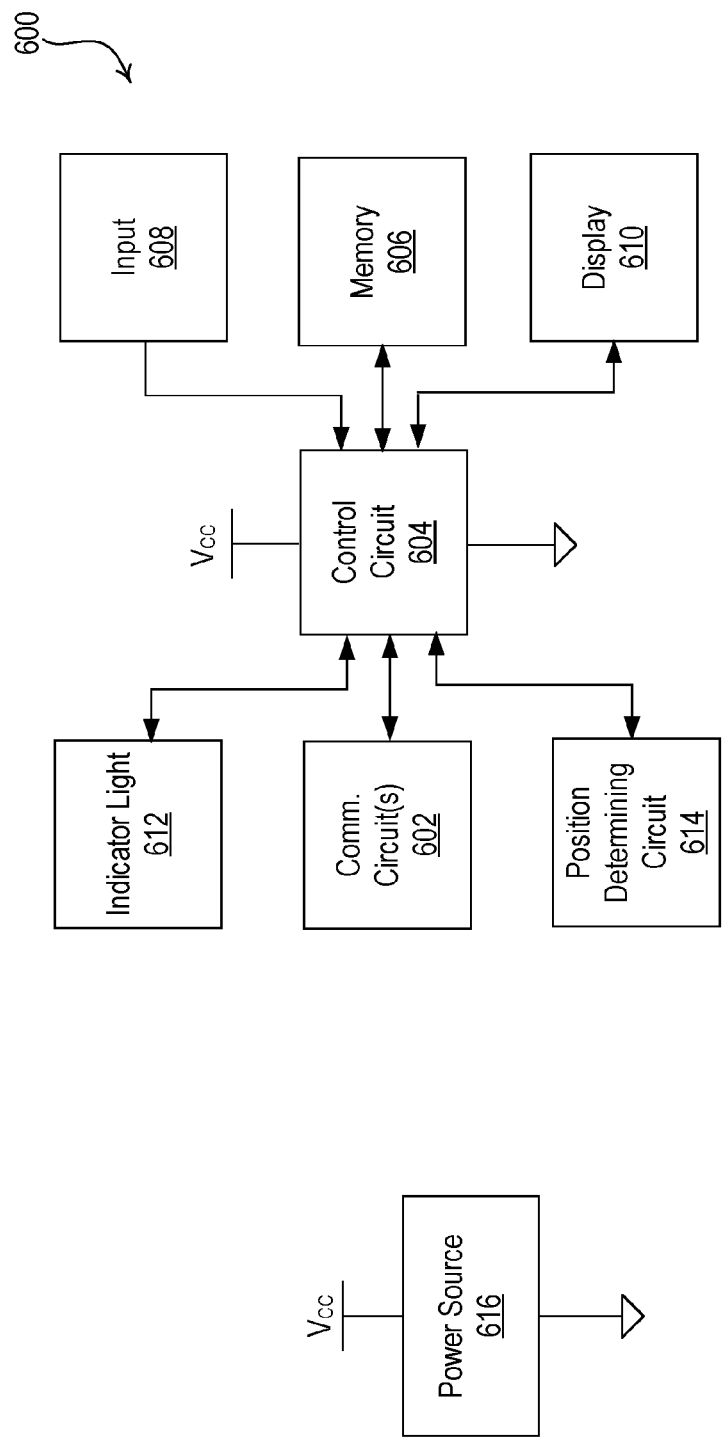
FIG. 6 is a block diagram depicting an example wearable wireless device.

FIG. 6 is a block diagram depicting an example wearable wireless device 600 (e.g., wearable wireless device 180 shown in FIG. 1, wearable wireless device 300 shown in FIGS. 3A-3E, and/or wearable wireless device 400 shown in FIG. 4) for performing load control. As shown in FIG. 6, the wearable wireless device 600 may include a control circuit 604 for controlling the functionality of the wearable wireless device 600. The control circuit 604 may include one or more general purpose processors, special purpose processors, conventional processors, digital signal processors (DSPs), microprocessors, integrated circuits, a programmable logic device (PLD), application specific integrated circuits (ASICs), or the like. The control circuit 604 may perform signal coding, data processing, power control, input/output processing, image processing, and/or any other functionality that enables the wearable wireless device 600 to perform as described herein.

The control circuit 604 may store information in and/or retrieve information from the memory 606. The memory 606 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, and/or any other type of removable memory.

The wearable wireless device 600 may communicate with other devices via a communication circuit 602. For example, the wearable wireless device 600 may communicate with a network device, a load control device, another wearable wireless device, and/or a gateway device using one or more protocols or frequencies. The communication circuit 602 of the wearable wireless device 600 may communicate with a network device, another wearable wireless device, and/or a gateway device for controlling one or more load control devices. The wearable wireless device 600 may include one or more communication circuits 602 for communicating with different devices on different protocols and/or frequencies. For example, the communication circuit 602 may include a communication circuit configured to communicate with a gateway device on a protocol or frequency and another communication circuit configured to communicate with a network device on another protocol or frequency.

The communication circuit 602 may be capable of performing wired and/or wireless communications. The communication circuit 602 may include a transmitter, receiver, and/or a transceiver. For example, the communication circuit 602 may include an RF transceiver for transmitting and receiving RF signals via an antenna or other communications module capable of performing wireless communications. The communication circuit 602 may be in communication with the control circuit 604. The communication circuit 602 may be capable of performing communications via different communication channels (e.g., communication protocols, communication frequencies, etc.). For example, the communication circuit 602 may be capable of communicating via WI-FI®, WIMAX®, BLUETOOTH®, near field communication (NFC), a proprietary communication protocol, such as CLEAR CONNECT™, ZIGBEE®, Z-WAVE, and/or the like. The communication circuit 602 may comprise an RF transmitter for transmitting RF signals, an RF receiver for receiving RF signals, an IR transmitter for transmitting IR signals, or an IR receiver for receiving IR signals.

The control circuit 604 may be in communication with an indicator light 612. The indicator light 612 may turn on and/or off to provide indications to a user, such as whether the wearable wireless device 600 is on or off, whether the wearable wireless device 600 has been enabled or disabled, whether the wearable wireless device 600 is in a programming mode, and/or the like. The control circuit 604 may receive audio data via one or more microphones (not shown) for capturing audio and may store the audio data in memory 606.

The control circuit 604 may be in communication with a display 610 (e.g., a visual display, such as an LED display) for providing information to a user. The display 610 and the control circuit 604 may be in two-way communication, as the display 610 may include a touch screen module capable of receiving information from a user and providing such information to the control circuit 604. For example, the display 610 may be a touch-responsive visual display having a touch sensitive element (e.g., a capacitive touch pad) displaced overtop the visual display. The touch sensitive element may allow the wearable wireless device 600 to display soft controls (e.g., soft buttons) that may be actuated by a user. The wearable wireless device 600 may be configured to provide a plurality of different soft controls to the user on the display 610 to allow the user to monitor and/or adjust operating characteristics and parameters of a load control system (e.g., the load control system 100 shown in FIG. 1). The display 610 of the wearable wireless device 600 may be smaller than the display of other devices (e.g., display 708 of the network device 700 shown in FIG. 7). The smaller visual display 610 of the wearable wireless device 600 may provide less space for enabling user control than the larger display 708 of the network device 700 shown in FIG. 7.

The wearable wireless device 600 may include another input circuit 608 from which user inputs may be received at the control circuit 604. The input circuit 608 may include one or more buttons (e.g., soft buttons) from which user inputs may be received. The input circuit 608 may include a dial (such as dial 186, shown in FIG. 1) that may be rotated by a user. For example, the dial may be used to scroll through displayed options on the display 610 of the wearable wireless device 600. The input circuit 608 may include a biometric sensor. The biometric sensor may include, for example, a fingerprint scanner, an eye scanner, and a heart rate monitor capable of identifying heart rate information for a user. The input source may include a camera from which images may be received at the control circuit 604.

The wearable wireless device 600 may include one or more position determining circuits 614. The position determining circuit 614 may be capable of determining the position and/or movement of the wearable wireless device 600. Position determining circuit 614 may include a global positioning system (GPS) circuit, a gyroscope, and/or an accelerometer. The GPS circuit may be capable of receiving GPS information. The control circuit 604 may be capable of determining the GPS coordinates of the wearable wireless device 600 based on the GPS information received via the GPS circuit. The gyroscope may identify an orientation of the wearable wireless device 600. For example, the control circuit 604 may be capable of determining the orientation of the wearable wireless device 600 based on the orientation information received via the gyroscope. The accelerometer may identify an acceleration of the wearable wireless device 600. The accelerometer may be used (e.g., used by the control circuit 604) to detect magnitude and/or direction of the acceleration of the wearable wireless device 600, such as in the form of a vector, an orientation of the wearable wireless device 600, and/or vibrations of the wearable wireless device 600.

Each of the modules of the wearable wireless device 600 may be powered by a power source 616. The power source 616 may include, for example, DC power source, such as a battery. The power source 616 may generate a supply voltage $V_{CC}$ for powering the modules of the wearable wireless device 600.

Figure 7:
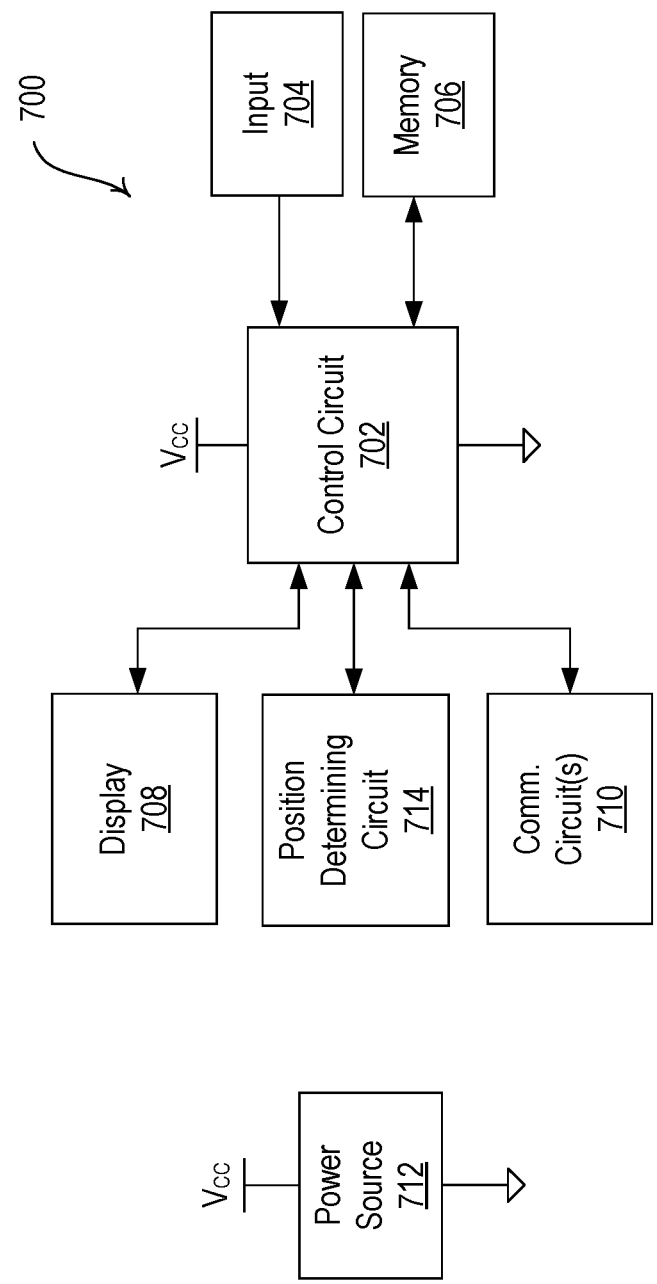
FIG. 7 is a block diagram depicting an example network device.

FIG. 7 is a block diagram illustrating an example network device 700 (e.g., the network device 170 shown in FIG. 1 and/or the network device 200 shown in FIG. 2). The network device 700 may include a control circuit 702 for controlling the functionality of the network device 700. The control circuit 702 may include one or more general purpose processors, special purpose processors, conventional processors, digital signal processors (DSPs), microprocessors, integrated circuits, a programmable logic device (PLD), application specific integrated circuits (ASICs), or the like. The control circuit 702 may perform signal coding, data processing, power control, input/output processing, or any other functionality that enables the network device 700 to perform as described herein.

The control circuit 702 may store information in and/or retrieve information from a memory 706. The memory 706 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The network device 700 may include one or more communication circuits 710 for transmitting and/or receiving information from other devices. For example, the network device 700 may communicate with a wearable wireless device, another network device, a load control device, and/or a gateway device using one or more protocols and/or frequencies. The communication circuit 710, for example, may include a communication circuit configured to communicate with a gateway device on a protocol or frequency and another communication circuit configured to communicate with a network device or a wearable wireless device on another protocol or frequency. The communication circuit 710 may perform wireless and/or wired communications. Communication circuit 710 may be in communication with control circuit 702 for transmitting and/or receiving information. The communication circuit 710 may include a transmitter, receiver, and/or a transceiver. For example, the communication circuit 710 may include an RF transceiver for transmitting and receiving RF signals via an antenna, or other communications module capable of performing wired and/or wireless communications. For example, the communication circuit 710 may be capable of communicating via WI-FI®, WIMAX®, BLUETOOTH®, cellular communication, near field communication (NFC), a proprietary communication protocol, such as CLEAR CONNECT™, ZIGBEE®, Z-WAVE, and/or the like.

The control circuit 702 may be in communication with a display 708 (e.g., a visual display, such as an LED display) for providing information to a user. The display 708 and the control circuit 702 may be in two-way communication, as the display 708 may include a touch screen module capable of receiving information from a user and providing such information to the control circuit 702. For example, the display 708 may be a touch-responsive visual display having a touch sensitive element (e.g., a capacitive touch pad) displaced overtop the visual display. The touch sensitive element may allow the network device 700 to display soft controls (e.g., soft buttons) that may be actuated by a user. The network device 700 may be configured to provide a plurality of different soft controls to the user on the display 708 to allow the user to monitor and/or adjust operating characteristics and parameters of a load control system (e.g., the load control system 100 shown in FIG. 1). The network device 700 may include another input source 704, such as a keyboard or other buttons, from which user inputs may be received at the control circuit 702.

The network device 700 may include one or more position determining circuits 714. The position determining circuit 714 may be capable of determining the position and/or movement of the network device 700. Position determining circuit 714 may include a global positioning system (GPS) circuit, a gyroscope, and/or an accelerometer. The GPS circuit may be capable of receiving GPS information. The control circuit 702 may be capable of determining the GPS coordinates of the network device 700 based on the GPS information received via the GPS circuit. The gyroscope may identify an orientation of the network device 700. For example, the control circuit 702 may be capable of determining the orientation of the network device 700 based on the orientation information received via the gyroscope. The accelerometer may identify an acceleration of the network device 700. The accelerometer may be used (e.g., used by the control circuit 702) to detect magnitude and/or direction of the acceleration of the network device 700, such as in the form of a vector, an orientation of the network device 700, and/or vibrations of the network device 700.

Each of the modules of the network device 700 may be powered by a power source 712. The power source 712 may include an AC power supply or DC power supply, for example. The power source 712 may generate a supply voltage $V_{CC}$ for powering the modules within the network device 700.

Figure 8:
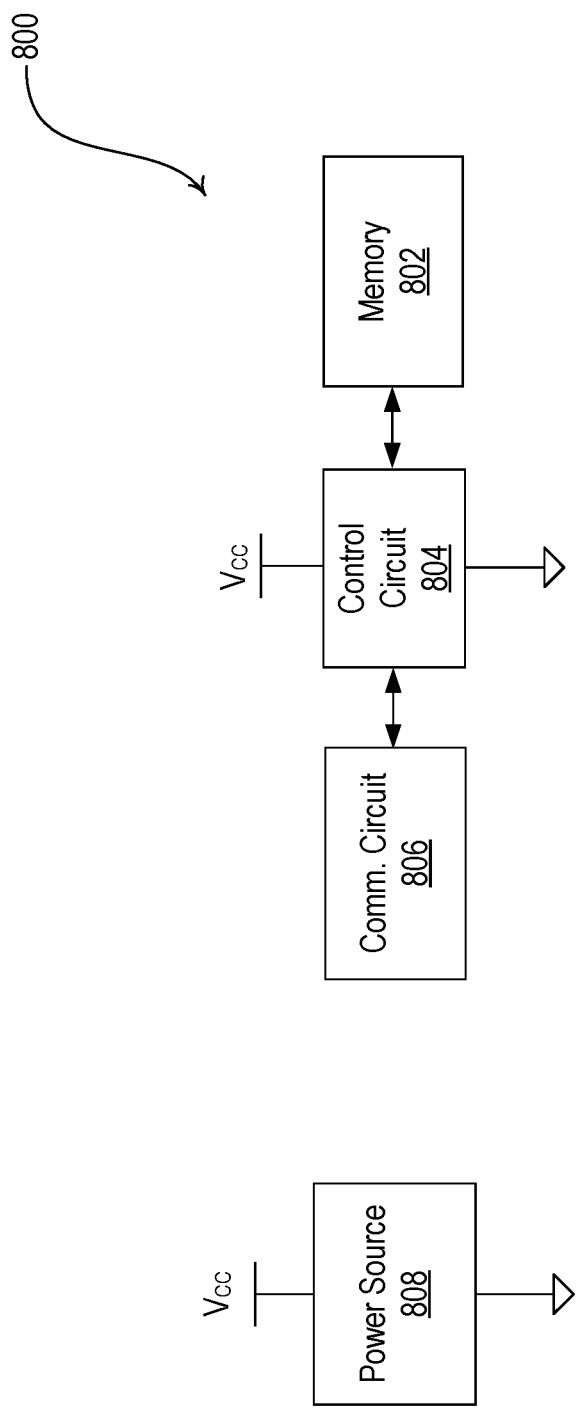
FIG. 8 is a block diagram depicting an example gateway device.

FIG. 8 is a block diagram depicting an example gateway device 800 (e.g., the gateway device 160 shown in FIG. 1). As shown in FIG. 8, the gateway device 800 may include a control circuit 804 for controlling the functionality of the gateway device 800. The control circuit 804 may include one or more general purpose processors, special purpose processors, conventional processors, digital signal processors (DSPs), microprocessors, integrated circuits, a programmable logic device (PLD), application specific integrated circuits (ASICs), or the like. The control circuit 804 may perform signal coding, data processing, image processing, power control, input/output processing, or any other functionality that enables the gateway device 800 to perform as described herein.

The control circuit 804 may store information in and/or retrieve information from the memory 802. The memory 802 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, and/or any other type of removable memory.

The gateway device 800 may communicate with other devices via a communication circuit 806. The gateway device 800 may include one or more communication circuits. The gateway device 800 may communicate with a network device, a load control device, another gateway device, and/or a wearable wireless device using one or more protocols and/or frequencies. For example, one communication circuit may communicate with a wearable wireless device and another communication circuit may communicate with a network device. The communication circuit 806 may be capable of performing wired and/or wireless communications. The communication circuit 806 may include a transmitter, a receiver, and/or a transceiver. For example, the communication circuit 806 may include an RF transceiver for transmitting and receiving RF signals via an antenna, or other communications module capable of performing wireless communications. The communication circuit 806 may be in communication with controller 804. The communication circuit 806 may be capable of performing communications via different communication channels. For example, the communication circuit 804 may be capable of communicating via WI-FI®, WIMAX®, BLUETOOTH®, near field communication (NFC), a proprietary communication protocol, such as CLEAR CONNECT™, ZIGBEE®, Z-WAVE, and/or the like.

Each of the modules of the gateway device 800 may be powered by a power source 808. The power source 808 may include, for example, an AC power source or a DC power source, such as a battery. The power source 808 may generate a supply voltage $V_{CC}$ for powering the modules of the gateway device 800.

Figure 9:
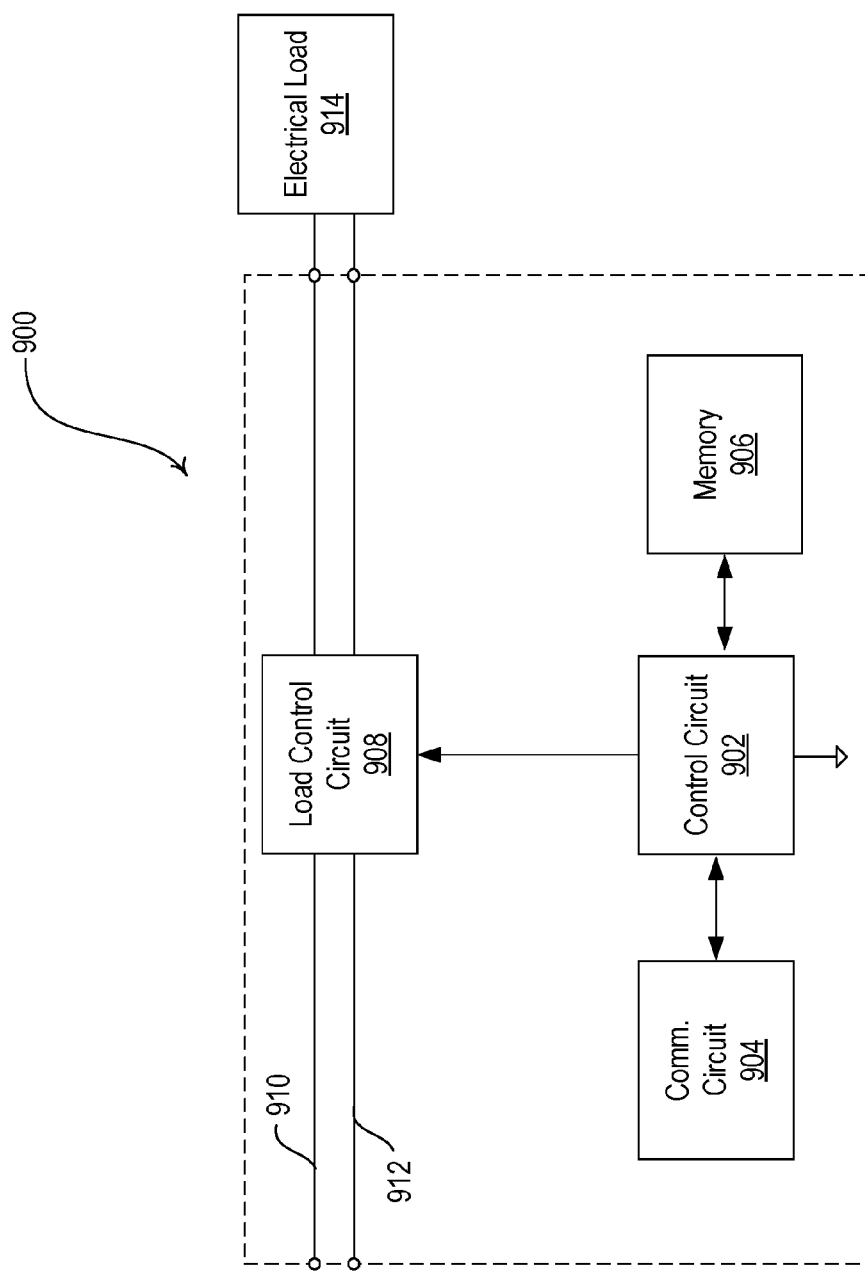
FIG. 9 is a block diagram depicting an example load control device.

FIG. 9 is a block diagram depicting an example load control device 900. The load control device 900 may include a dimmer switch, an electronic switch, an electronic ballast for controlling fluorescent lamps, a light-emitting diode (LED) driver for controlling LED light sources, a plug-in control device (e.g., a switching device), a thermostat, a motorized window treatment, or other load control device for controlling an electrical load. The example load control device 900 may include a control circuit 902 for controlling the functionality of the load control device 900. The control circuit 902 may include one or more general purpose processors, special purpose processors, conventional processors, digital signal processors (DSPs), microprocessors, integrated circuits, a programmable logic device (PLD), application specific integrated circuits (ASICs), or the like. The control circuit 902 may perform signal coding, data processing, power control, input/output processing, and/or any other functionality that enables the load control device 900 to perform as described herein.

The load control device 900 may communicate with other devices via the communication circuit 904. The communication circuit 904 may be in communication with controller 902. The communication circuit 904 maybe capable of performing wired and/or wireless communications. The communication circuit 904 may include an RF transceiver for transmitting and receiving RF signals via an antenna, or other communications module capable of performing wired and/or wireless communications. For example, the communication circuit 904 may be capable of communicating via WI-FI®, WIMAX®, BLUETOOTH®, near field communication (NFC), a proprietary communication protocol, such as CLEAR CONNECT™, ZIGBEE®, Z-WAVE, and/or the like.

The control circuit 902 may store information in and/or retrieve information from the memory 906. The memory 906 may include a non-removable memory and/or a removable memory. A load control circuit 908 may receive instructions from the control circuit 902 and may control the electrical load 914 (e.g., by controlling the amount of power provided to the load) based on the received instructions. The load control circuit 908 may receive power via a hot connection 910 and a neutral connection 912. While the load control device 900 may include four terminals as shown in FIG. 9, the load control device 900 may include one load terminal connected to the electrical load 914, which may be connected in series between the load control device 900 and a neutral of the AC power source supplying power to the hot connection 910 and the neutral connection 912. In other words, the load control device 900 may be a "three-wire" device. The load control device 900 may have one connection to the AC power source (e.g., hot connection 910) and may not comprise a connection to the neutral of the AC power source (e.g., may not comprise neutral connection 912). In other words, the load control device 900 may be a "two-wire" device. The electrical load 914 may include any type of electrical load.

Although features and elements are described above in particular combinations, each feature or element may be used alone or in any combination with the other features and elements. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

What is claimed is:

1. A non-transitory computer readable medium having instructions stored thereon that when executed by a wireless device configure the wireless device to:
    display, via a first touch-responsive visual display of the wireless device, a first feedback of a parameter of a load control device;
    receive, via the first visual display, a first user input to adjust the parameter of the load control device; and
    responsive to the first user input, cause a first adjustment of the parameter by communicating, via a communication circuit of the wireless device, one or more messages to a network device; and
wherein the instructions, when executed by the network device, configure the network device to:
    display, via a second touch-responsive visual display of the network device, a second feedback of the parameter of the load control device; and
    receive, via the second visual display, a second user input to adjust the parameter of the load control device; and
    responsive to the second user input, cause a second adjustment of the parameter;
    wherein user inputs received via the first touch-responsive visual display of the wireless device cause adjustments of the parameter of the load control device by a greater percentage than user inputs received via the second touch-responsive visual display of the network device.

2. The non-transitory computer readable medium of claim 1, wherein the load control device comprises a dimmer switch for controlling a lighting load, and the parameter comprises an intensity of the lighting load.

3. The non-transitory computer readable medium of claim 2, wherein the instructions, when executed by the wireless device, further configure the wireless device to update the first feedback on the first touch-responsive visual display to indicate the intensity of the lighting load when the network device causes an adjustment of the intensity of the lighting load.

4. The non-transitory computer readable medium of claim 2, wherein:
    the first feedback comprises an intensity meter; and
    to display the first feedback comprises to highlight at least a portion of the intensity meter.

5. The non-transitory computer readable medium of claim 4, wherein, when the lighting load is off, the intensity meter is un-highlighted.

6. The non-transitory computer readable medium of claim 2, wherein to cause the first adjustment of the parameter further comprises to cause an adjustment of the parameter to one of a plurality of preset intensities.

7. The non-transitory computer readable medium of claim 2, wherein:
    the first feedback comprises an intensity meter divided into a number of segments; and
    to display the first feedback comprises to highlight at least one of the segments to indicate the intensity of the lighting load when the lighting load is on.

8. The non-transitory computer readable medium of claim 7, wherein, when the lighting load is off, each of the segments of the intensity meter is un-highlighted.

9. The non-transitory computer readable medium of claim 7, wherein the instructions, when executed by the wireless device, further configure the wireless device to update the intensity meter on the first touch-responsive visual display to indicate the intensity of the lighting load when the network device causes an adjustment of the intensity of the lighting load.

10. The non-transitory computer readable medium of claim 7, wherein:
    each of the number of segments of the intensity meter represents a portion of a dimming range of the dimmer switch; and
    each portion of the dimming range is defined by a minimum intensity and a maximum intensity.

11. The non-transitory computer readable medium of claim 10, wherein:
    to cause the first adjustment of the parameter further comprises to cause an adjustment of the parameter to one of a plurality of preset intensities; and
    each preset intensity of the plurality of preset intensities corresponds to the maximum intensity of one of the segments.

12. The non-transitory computer readable medium of claim 11, wherein the intensity meter comprises one of:
    three segments, and the plurality of preset intensities comprise 0%, 33%, 66%, and 100%;
    four segments, and the plurality of preset intensities comprise 0%, 25%, 50%, 75%, and 100%; and
    five segments, and the plurality of preset intensities comprise 0%, 20%, 40%, 60%, 80%, and 100%.

13. The non-transitory computer readable medium of claim 10, wherein:
    the first user input comprises an input to raise the intensity of the lighting load; and
    to cause the first adjustment of the parameter comprises to cause the lighting load to adjust to the maximum intensity of a next-highest portion of the dimming range.

14. The non-transitory computer readable medium of claim 13, wherein the instructions, when executed by the wireless device, further configure the wireless device to highlight a next-highest segment of the intensity meter based on the first user input comprising the input to raise the intensity of the lighting load.

15. The non-transitory computer readable medium of claim 10, wherein:
    the first user input comprises an input to lower the intensity of the lighting load; and
    to cause the first adjustment of the parameter comprises to cause the lighting load to adjust to the maximum intensity of a next-lowest portion of the dimming range.

16. The non-transitory computer readable medium of claim 15, wherein the instructions, when executed by the wireless device, further configure the wireless device to not highlight a present highest highlighted segment of the intensity meter based on the first user input comprising the input to lower the intensity of the lighting load.

17. The non-transitory computer readable medium of claim 1, wherein:
the wireless device comprises a dial;
the instructions, when executed by the wireless device, further configure the wireless device to cause a third adjustment of the parameter in response to a rotation of the dial; and
user inputs received via the first visual touch-responsive display of the wireless device cause adjustments of the parameter of the load control device by a greater percentage than rotations of the dial.

18. The non-transitory computer readable medium of claim 1, wherein the load control device comprises a motorized window treatment, and the parameter comprises a position of the motorized window treatment.

19. The non-transitory computer readable medium of claim 1, wherein the wireless device comprises a smart watch and the network device comprises a smart phone.

20. The non-transitory computer readable medium of claim 1, wherein the greater percentage comprises a multiple of adjustments provided by the network device.

21. The non-transitory computer readable medium of claim 20, wherein the multiple comprises is at least one of a factor of 10, 25, and 33.

22. The non-transitory computer readable medium of claim 1, wherein the instructions, when executed by the wireless device, further configure the wireless device to update the first feedback on the first touch-responsive visual display to indicate the parameter of the load control device when the network device causes an adjustment of the parameter of the load control device.

23. A non-transitory computer readable medium having instructions stored thereon that when executed by a wireless device cause the wireless device to:
display, via a touch-responsive visual display of the wireless device, a feedback of a parameter of a load control device, wherein the load control device is configured to be responsive to a network device to provide adjustments of the parameter;
receive, via the touch-responsive visual display, a user input to adjust the parameter of the load control device; and
responsive to the user input, cause an adjustment of the parameter by communicating, via a communication circuit of the wireless device, one or more messages to the network device;
wherein user inputs received via the touch-responsive visual display of the wireless device cause adjustments of the parameter of the load control device by a greater percentage than adjustments provided by the network device.

24. The non-transitory computer readable medium of claim 23, wherein the load control device comprises one of:
a dimmer switch for controlling a lighting load, and the parameter comprises an intensity of the lighting load; and
a motorized window treatment, and the parameter comprises a position of the motorized window treatment.

25. The non-transitory computer readable medium of claim 23, wherein the instructions, when executed by the wireless device, further configure the wireless device to update the feedback on the touch-responsive visual display to indicate the parameter of the load control device when the network device causes an adjustment of the parameter of the load control device.

26. The non-transitory computer readable medium of claim 23, wherein:
the load control device comprises a dimmer switch for controlling a lighting load;
the parameter comprises an intensity of the lighting load;
the feedback comprises an intensity meter; and
to display the feedback comprises to highlight at least a portion of the intensity meter.

27. The non-transitory computer readable medium of claim 26, wherein, when the lighting load is off, the intensity meter is un-highlighted.

* * * * *